(12) United States Patent
Krämer et al.

(10) Patent No.: US 12,283,862 B2
(45) Date of Patent: Apr. 22, 2025

(54) METHOD FOR OPERATING A LINEAR MOTOR

(71) Applicant: B&R INDUSTRIAL AUTOMATION GMBH, Eggelsberg (AT)

(72) Inventors: Christian Krämer, Vienna (AT); Wolfgang Kemmetmüller, Vienna (AT); Andreas Kugi, Vienna (AT); Andreas Weber, Eggelsberg (AT); Manuel Plainer, Eggelsberg (AT); Michael Reinthaler, Eggelsberg (AT); Engelbert Grünbacher, Eggelsberg (AT)

(73) Assignee: B&R INDUSTRIAL AUTOMATION GMBH, Eggelsberg (AT)

(*) Notice: Subject to any disclaimer, the term of this patent is extended or adjusted under 35 U.S.C. 154(b) by 163 days.

(21) Appl. No.: 18/024,406

(22) PCT Filed: Aug. 30, 2021

(86) PCT No.: PCT/EP2021/073871
§ 371 (c)(1),
(2) Date: Mar. 2, 2023

(87) PCT Pub. No.: WO2022/049026
PCT Pub. Date: Mar. 10, 2022

(65) Prior Publication Data
US 2024/0030797 A1  Jan. 25, 2024

(30) Foreign Application Priority Data

Sep. 3, 2020 (AT) ................. A 50749/2020

(51) Int. Cl.
*H02K 41/035* (2006.01)
*H02K 41/02* (2006.01)
(Continued)

(52) U.S. Cl.
CPC ........... *H02K 41/035* (2013.01); *H02P 25/06* (2013.01)

(58) Field of Classification Search
CPC .... H02K 41/035; H02K 41/031; H02K 41/02; H02K 41/03; H02K 11/30
(Continued)

(56) References Cited

U.S. PATENT DOCUMENTS 6,876,107 B2   4/2005  Jacobs
8,344,669 B1 * 1/2013  Gadda ................... H02P 6/006
                                                        318/135

(Continued)

FOREIGN PATENT DOCUMENTS

EP    2 634 913    9/2013
EP    3 037 903    6/2016
(Continued)

OTHER PUBLICATIONS

Khong, P.C. et al., "Magnetic guidance of the mover in a long-primary linear motor", IEEE Transactions on Industry Applications, vol. 47, No. 3, May/Jun. 2011, ., pp. 1319-1327.
(Continued)

*Primary Examiner* — Jose A Gonzalez Quinones
(74) *Attorney, Agent, or Firm* — GREENBLUM & BERNSTEIN, P.L.C.

(57) ABSTRACT

To control movement of a transport unit of a linear motor, a quality functional J(SG) with quality terms $JT_k$(SG) is used as a function of manipulated variables (SG) of active drive coils. The quality functional J(SG) controlling movement of the transport unit along the stator is optimized with regard to the manipulated variable (SG) to determine optimal manipulated variables ($SG_{opt}$) for the relevant time step of the control of movement, active drive coils are energized according to the determined optimal manipulated variables (Continued)

Figure 1:
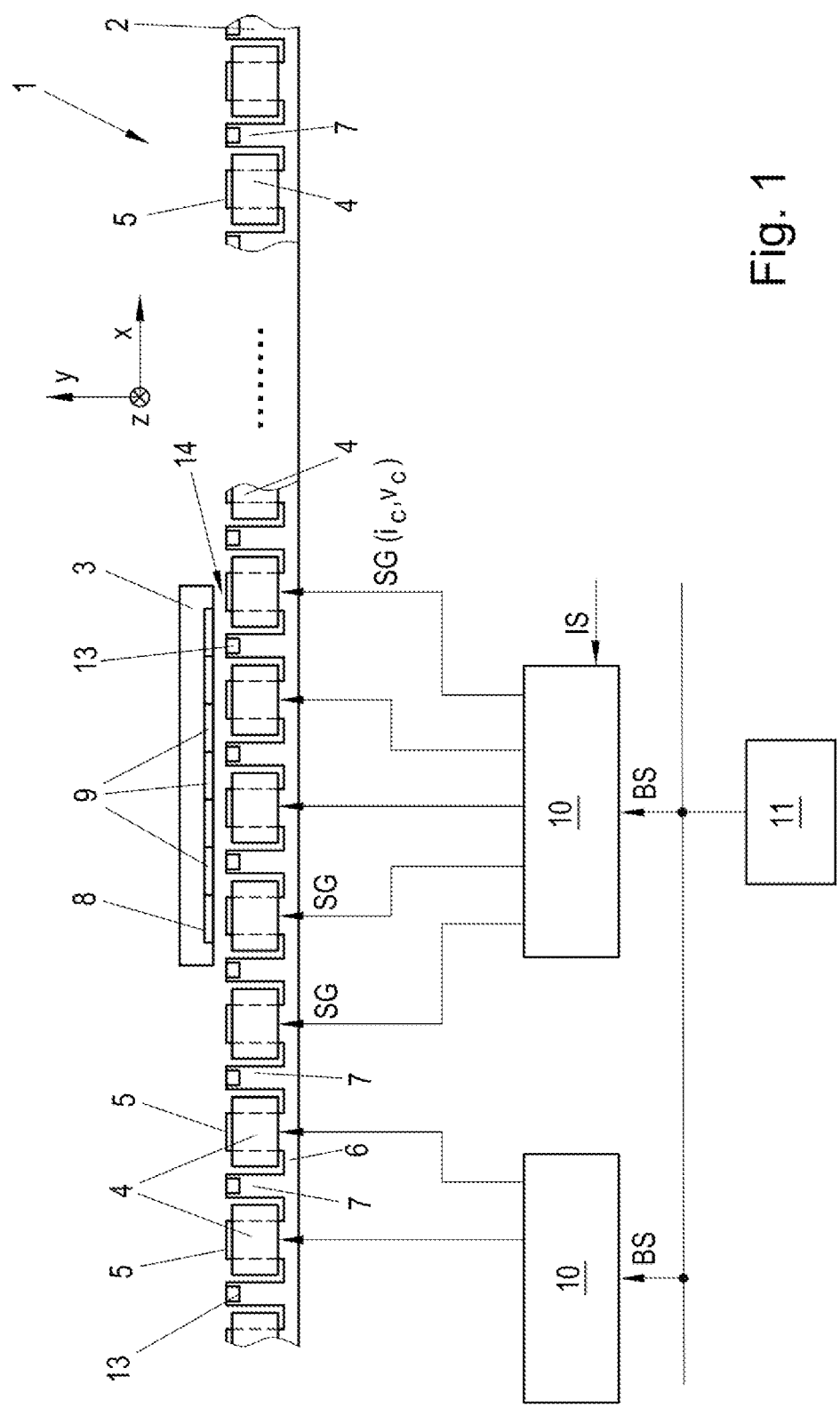

($SG_{opt}$), and at least two movement phases are provided during the movement of the transport unit along the stator. In the at least two novement phases, different quality functionals $J(SG)$ are used for determining the optimal manipulated variables ($SG_{opt}$), the different quality functionals $J(SG)$ differing by the number k of the quality terms $JT_k(SG)$ used and/or by the quality terms $JT_k(SG)$ and/or by the weighting factors $k_k$.

18 Claims, 6 Drawing Sheets

(51) Int. Cl.
*H02K 41/03* (2006.01)
*H02P 25/06* (2016.01)

(58) Field of Classification Search
USPC ............................ 310/12.01, 12.12, 12.13
See application file for complete search history.

(56) References Cited

U.S. PATENT DOCUMENTS

| | | |
|---|---|---|
| 8,796,959 B2 | 8/2014 | Sato |
| 9,202,719 B2 | 12/2015 | Lu et al. |
| 10,177,640 B2 | 1/2019 | Achterberg et al. |
| 10,246,266 B2 | 4/2019 | Weber et al. |
| 10,250,176 B2 | 4/2019 | Faschang et al. |
| 10,454,355 B2 | 10/2019 | Weber et al. |
| 10,554,102 B2 | 2/2020 | Weber et al. |
| 10,622,921 B2 | 4/2020 | Weber et al. |
| 2008/0115372 A1 | 5/2008 | Vogel et al. |
| 2008/0215164 A1 | 6/2008 | Denk et al. |
| 2013/0074724 A1 | 3/2013 | King et al. |
| 2016/0179079 A1* | 6/2016 | Kram ................... G05B 19/416 700/186 |
| 2017/0346380 A1* | 11/2017 | Weber ..................... B60L 15/38 |

FOREIGN PATENT DOCUMENTS

| | | | |
|---|---|---|---|
| EP | 3 249 803 | 11/2017 | |
| EP | 3 251 986 | 12/2017 | |
| EP | 3 385 110 | 10/2018 | |
| EP | 3 422 558 | 1/2019 | |
| EP | 3 109 998 | 8/2019 | |
| JP | H05-168283 | 7/1993 | |
| WO | 2004/103792 | 12/2004 | |
| WO | WO-2007014832 A1 * | 2/2007 | .............. B25J 9/163 |
| WO | 2013/143783 | 10/2013 | |

OTHER PUBLICATIONS

Deng et al. "Forces and parameters of permanent magnet linear synchronous machines," IEEE Transactions on Magnetics, vol. MAG-3, No. 1 (Jan. 1987).
Boldea et al., "Linear Electric Actuators and Generators," Cambridge Univ. Press, Chapt. 4, (1997).
Austria Search Report conducted in counterpart Austria Appln. No. A 50749/2020, dated Jul. 19, 2021.
Int'l Search Report (Form PCT/ISA/210) conducted in Int'l Appln. No. PCT/EP2021/073871 (Dec. 8, 2021).
Int'l Written Opinion (Form PCT/ISA/237) conducted in Int'l Appln. No. PCT/EP2021/073871 (Dec. 8, 2021).
Int'l Prelim. Exam. Report (Form PCT/IPEA/409) conducted in Int'l Appln. No. PCT/EP2021/073871 (Jul. 29, 2022).

* cited by examiner

METHOD FOR OPERATING A LINEAR MOTOR

The present invention relates to a method for operating a linear motor comprising a stator, on which a plurality of drive coils is arranged, and comprising a transport unit, which is moved along the stator and on which a plurality of drive magnets is arranged, wherein an electromagnetic field, which interacts with the drive magnets of the transport unit for moving the transport unit, is generated by energizing drive coils in the region of the drive magnets of the transport unit.

In a linear motor, a primary part is provided and a secondary part (rotor) is provided which is arranged so as to be movable relative to the primary part. Drive coils are arranged on the primary part, and drive magnets are arranged on the secondary part, or vice versa. The drive magnets are designed as permanent magnets, electrical coils, or short-circuit windings. The drive coils are electrical coils that are energized to generate an electromagnetic field. Due to the interaction of the (electro)magnetic fields of the drive magnets and the drive coils, forces act on the secondary part, which forces move the secondary part relative to the primary part. The linear motor can be designed, for example, as a synchronous machine or as an asynchronous machine. The linear motor may also be designed as a planar linear motor (also called planar motor). The drive coils of the linear motor are either arranged along a movement direction or, in the case of a planar motor, along two movement directions, i.e., in a movement plane. The secondary part can be moved along this one movement direction or can be moved freely in the movement plane in the two movement directions. A distinction can also be made between short-stator linear motors and long-stator linear motors, the secondary part being shorter than the primary part in the long-stator linear motor and the primary part being shorter than the secondary part in the short-stator linear motor. In the planar motor, the primary part is usually larger than the secondary part.

Linear motors are used in electromagnetic transportation systems in which a transport unit is moved in order to perform a transport task. The transport unit can be designed as a secondary part or a primary part. Usually, such an electromagnetic transport system is designed in the form of a long-stator linear motor or planar motor.

In a long-stator linear motor, a plurality of electrical drive coils are arranged next to one another in a stationary manner along a stator. A number of drive magnets, either as permanent magnets or as an electrical coil or a short-circuit winding, which are separated by an air gap from the drive coils and which interact with the drive coils, are arranged on a transport unit. Due to the interaction of the (electro) magnetic fields of the drive magnets and the drive coils, forces act on the transport unit, which forces move the transport unit along the stator. In a planar motor, the drive coils are arranged in a plane on the stator. Likewise, there are drive magnets which are arranged in a plane on the transport unit.

Often, a specific number of drive coils are arranged on individual stator segments. The stator segments can also have different geometries, such as straight lines, curves, switches etc. The stator segments can then be assembled to form the desired stator by arranging them in a row. However, the use of such stator segments and the number of such stator segments is irrelevant to the linear motor according to the invention and so are the number and arrangement of the drive coils on a stator segment.

By energizing the drive coils in the region of the drive magnets of the transport unit, a magnetic field can be generated which interacts with the magnetic field of the drive magnets in order to generate a propulsive force (in the movement direction along the stator or, in the case of a planar motor, in the movement direction in a movement plane along the stator) and/or a normal force (in the direction transverse to the movement direction) acting on the transport unit. The resulting forces can be influenced by controlling the individual drive coils in order to control the generated magnetic flux. As a result, the transport unit can be moved in the desired manner along the transport route (which comprises a transport plane in the case of a planar motor) by controlling the drive coils to generate a magnetic field that is moved in the movement direction. It is also possible to arrange, along the transport route, a plurality of transport units the movements of which can be controlled individually and independently of one another by energizing the drive coils, generally by applying an electrical voltage, interacting with a respective transport unit.

Examples of long-stator linear motors can be found in WO 2013/143783 A1, U.S. Pat. No. 6,876,107 B2, US 2013/0074724 A1 or WO 2004/103792 A1. For example, U.S. Pat. No. 9,202,719 B2 discloses the basic structure and mode of operation of a planar motor.

In order to control the movement of a transport unit, a dq-coordinate system moving along with the transport unit is usually used, analogously to rotative motors. In the case of a planar motor also separately in the two movement directions. A drive current required for the desired movement is then calculated in the dq-coordinate system, with a current component in the movement direction (often also referred to as q-component) and possibly a current component in the normal direction (i.e., transverse to the movement direction, often also referred to as d-component). The q-component is responsible for the generation of the propulsive force and the d-components are responsible for the generation of a normal force transverse to the propulsive force. However, no active normal force (i.e., by energizing the drive coils) is generally required for normal movement along the stator. The drive current in the dq-coordinate system is then converted, analogously to the rotative motor, with an inverse Park transformation into the coil currents of the drive coils involved in the generation of the forces, which coil currents are then generated by applying a corresponding voltage to the drive coils by means of a power electronics system. This is repeated with a time step specified for the control, typically in the $\frac{1}{10}$ millisecond range. Due to the movement of the transport unit, different drive coils will also be involved during the movement. This control is independent of whether forces are generated on both sides (as viewed in the movement direction of the transport unit) of the transport unit, or only on one side.

Such a control on the basis of a dq-model of the long-stator linear motor is described, for example, in Khong, P. C., et al., "Magnetic guidance of the mover in a long-primary linear motor," IEEE Transactions on Industry Applications, Vol. 47, No. 3, May/June 2011, pp. 1319-1327. Khong describes a long-stator linear motor with drive coils arranged on both sides, as viewed in the movement direction, and the normal forces on the two sides are used to center the transport unit in the center for guidance.

EP 3 385 110 A1 describes a long-stator linear motor in which the propulsive force and the normal force are controlled independently of one another in order to be able to adapt the normal force to the conditions of the transport route. In EP 3 109 998 B1 the normal force or a torque is used for the control of the movement of the transport unit in a switch.

For the control of the forces and/or torques acting on the transport unit, a controller, often also a controller cascade consisting of several successive controllers, is used to compensate for a deviation between a specified setpoint, for example a setpoint position or setpoint speed, and an actual variable, for example an actual position or actual speed. Often, a plurality of controllers are also provided along the stator, for example one controller per stator segment (as described in EP 3 422 558 A1). On the basis of an implemented control rule, the controller, often a PI controller or PID controller, determines a manipulated variable, for example electrical voltages to be applied to the drive coils, which manipulated variable is then implemented on the linear motor. For example, the manipulated variable is implemented for the drive coils by a power electronics system, i.e., generated and applied to the drive coils. A conventional controller comprises controller parameters which must be adapted to the respective controlled system, here stator with drive coils and transport unit with drive magnets and the magnetic coupling thereof, in order to set the desired control behavior, such as control errors, overshooting, stability, response behavior, etc. The controller must therefore be parametrized, which means that corresponding values must be assigned to the controller parameters. These controller parameters are usually fixedly specified and are not changed during operation.

EP 3 251 986 A1 describes the parametrization of the controller parameters for a long-stator linear motor. In this case, it can also be provided to use different controller parameter sets for different transport units or for different locations of the transport route in order to be able to adapt the control behavior to different transport units in the best possible manner, for example on the basis of different loading, wear state, design etc. For parametrization, the controlled system is excited with an excitation signal superimposed on the manipulated variables, and the response of the controlled system to the excitation in the form of the frequency response is evaluated in order to derive the controller parameters therefrom. On the one hand, this is complicated and can, on the other hand, be done only at a specific location of the transport route and for a specific transport unit. Although the control can be improved in this approach, it is still inflexible.

It is an object of the present invention to improve the control of the movement of a transport unit of a linear motor, in particular to make it more flexible.

This object is achieved with the features of independent Claim 1.

For the most accurate control of the movement, the quality functional contains a quality term, which evaluates a deviation of a specified setpoint variable of the control from an actual variable of the control which is dependent on the manipulated variable. This allows a high control quality of the control of the movement of the transport unit. By using different quality functionals in different movement phases of the movement of the transport unit, the control can be flexibly adapted to the respective movement and different control objectives can be pursued in the movement phases. The movement phases can be configured flexibly along the stator, as can the quality functional in the movement phases. This does not change the basic sequence of the control of the movement of the transport unit since only different quality functionals are optimized.

The optimization-based control of the movement of the transport unit allows both on-line optimization and off-line optimization of the quality functional. This further increases the flexibility of the control of the movement.

In the case of off-line optimization, it is in particular advantageous to create movement characteristic maps for different quality functionals in advance, which movement characteristic maps map a movement setpoint variable, in particular a driving force, and a position of the transport unit relative to the active drive coils on the optimal manipulated variables. The optimal manipulated variables for the control of the movement of the transport unit thus must only be read on-line from the correct movement characteristic map.

Preferably, the quality functional contains a quality term, which evaluates the electrical power required for the movement of the transport unit. This makes it possible to provide a movement phase in which the movement of the transport unit takes place with as little electrical power loss as possible. This allows an energy-efficient operation of the linear motor.

If the quality functional contains a quality term that evaluates a sum of the manipulated variables, the thermal load on the components of the power electronics system for implementing the manipulated variables, and the heating of the stator can be reduced.

Advantageously, a mathematical model of the linear motor is used, with which a variable of a quality term can be determined or which can be used for a constraint of the optimization. With the model, specific variables or quantities can be calculated instead of measuring them in the linear motor. With the model, the state variables of the linear motor and also all required output variables can also be determined. When a constraint is used, it is ensured that the physical laws of the linear motor are taken into account, which can improve the control quality in general.

Particularly advantageously, the linear motor is mathematically modeled with a reluctance network, i.e., with system equations that are derived from the reluctance network and reflect the physical laws. A high system quality (accuracy) in comparison to model complexity can be achieved with a reluctance model.

Figure 2:
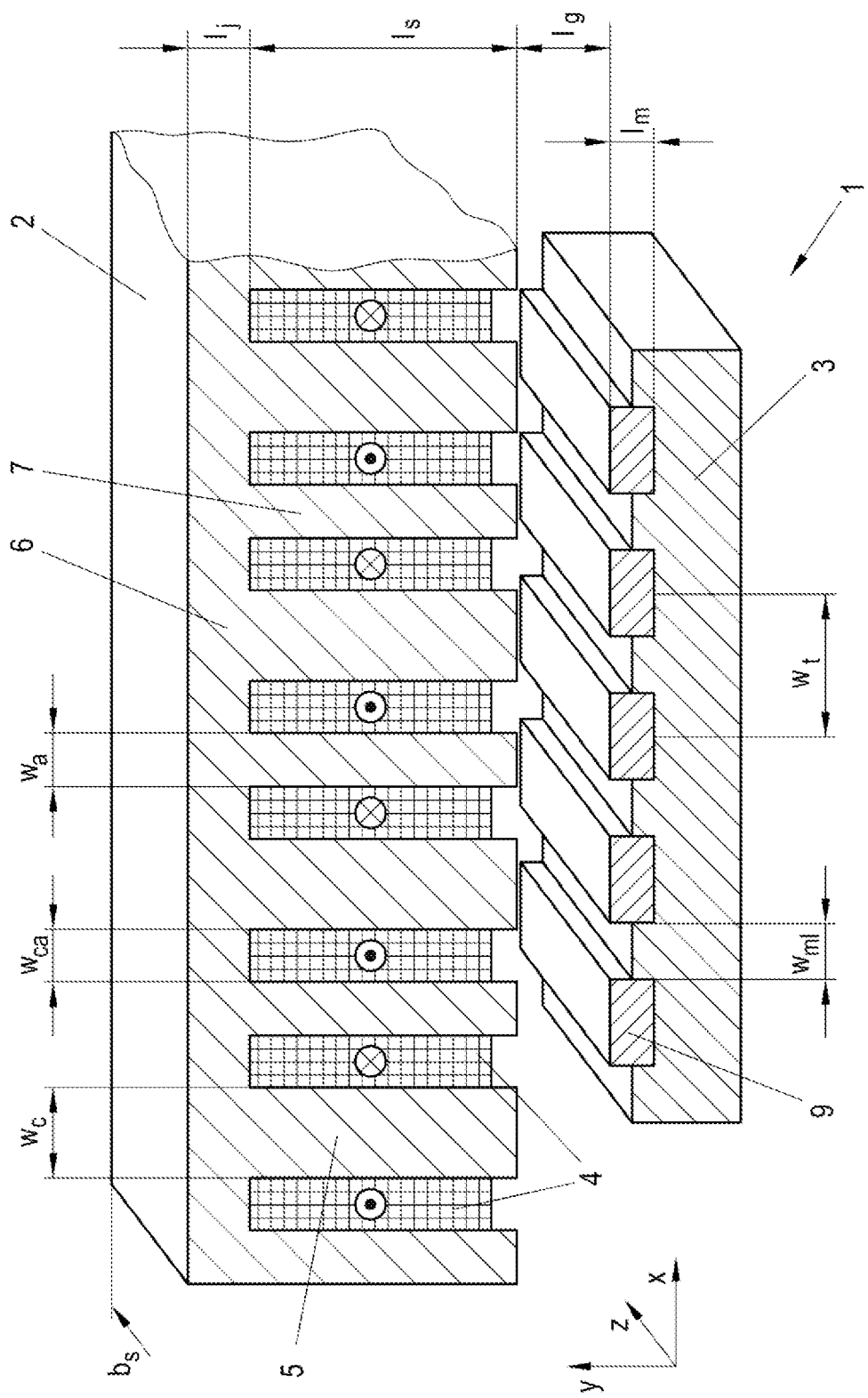
Figure 3:
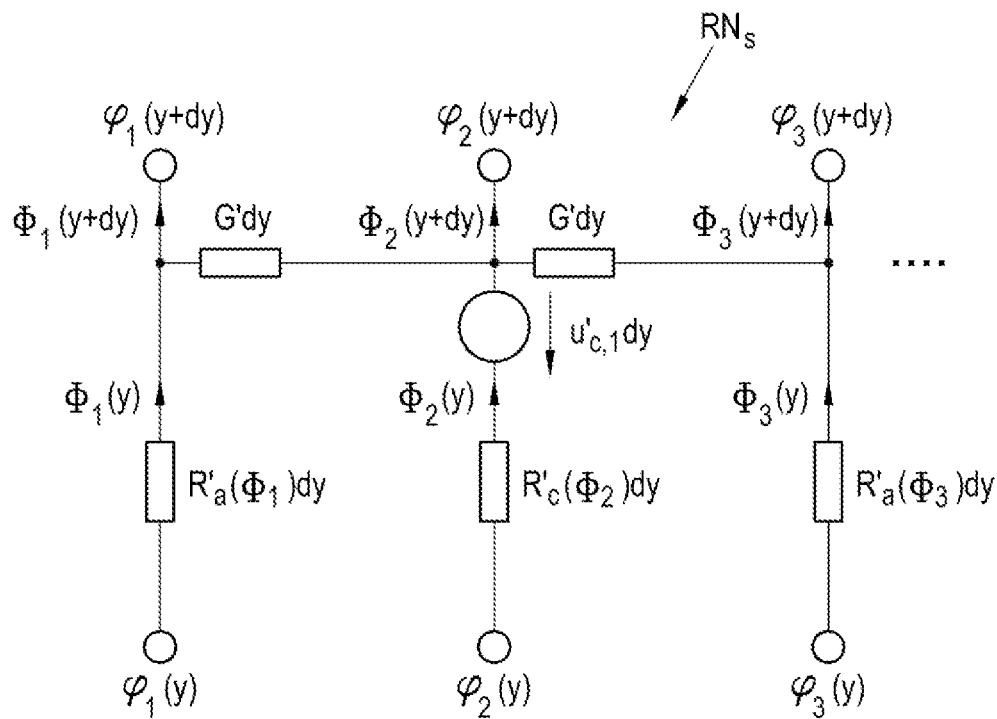
Figure 4:
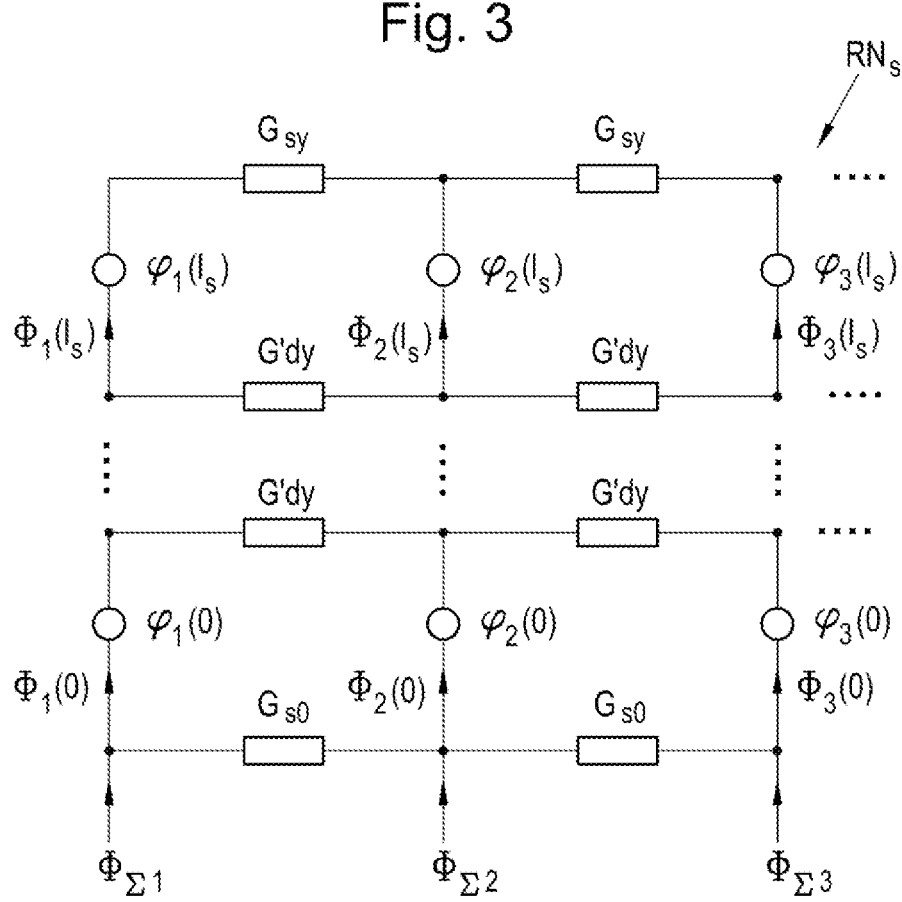
Figure 5:
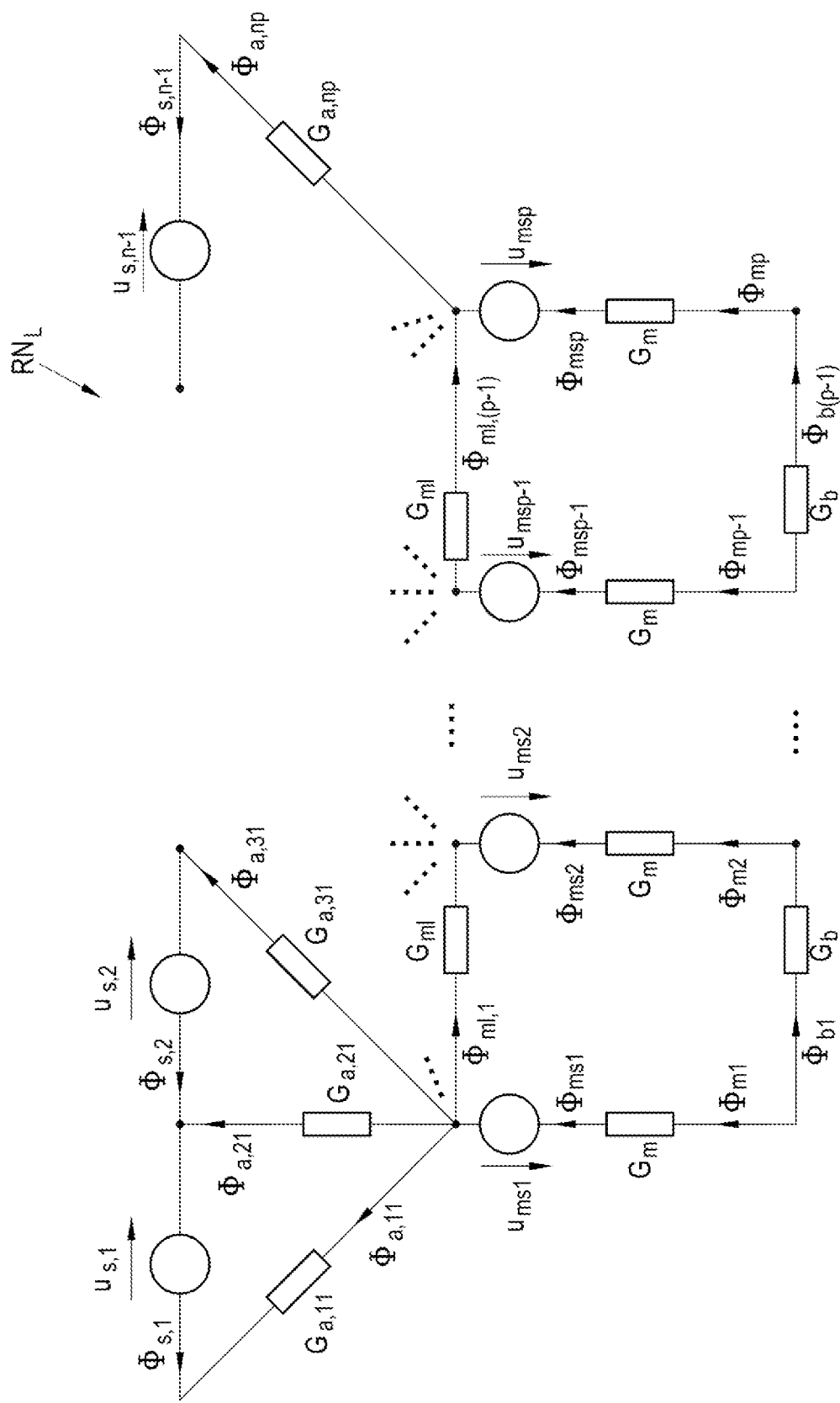
Figure 6:
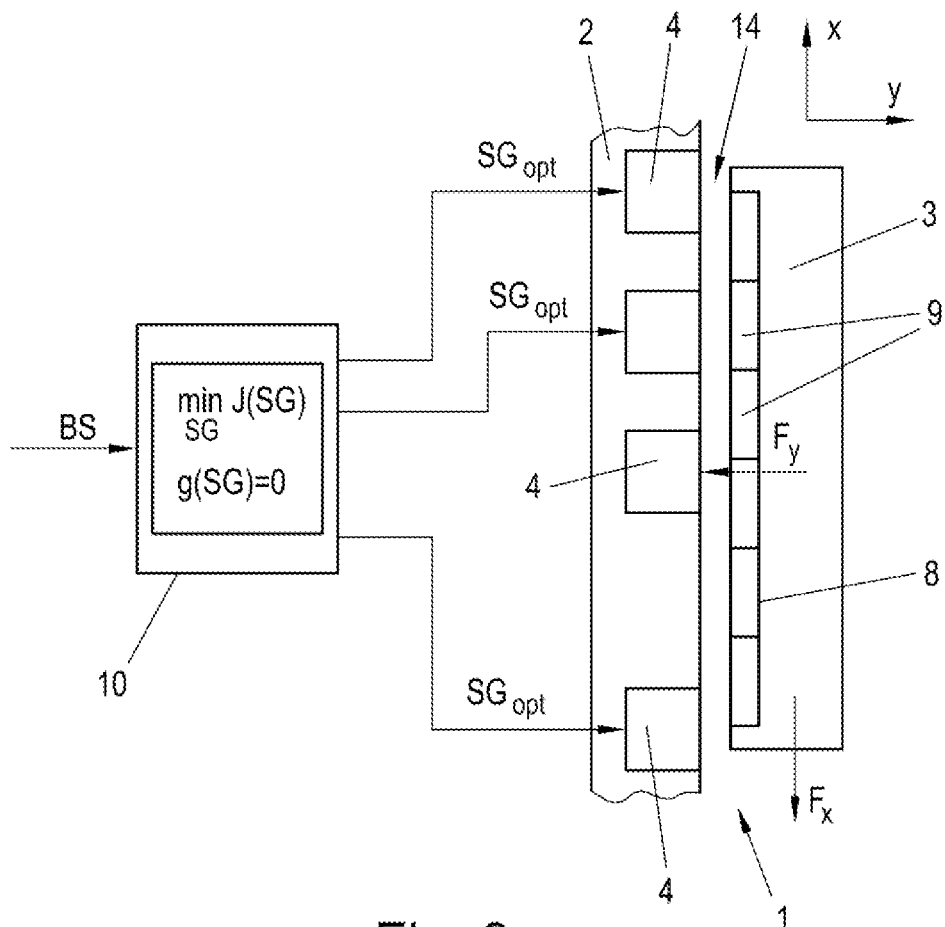
Figure 9:
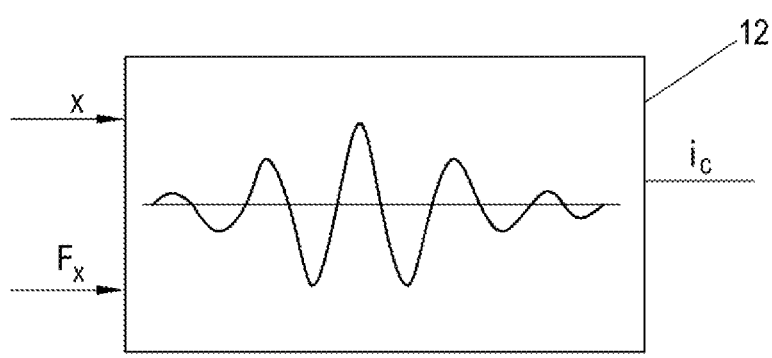
Figure 7:
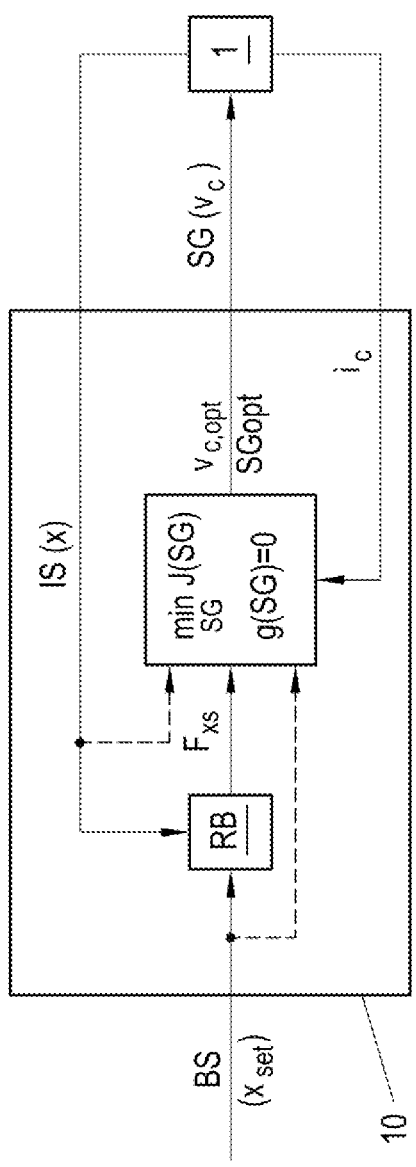
Figure 8:
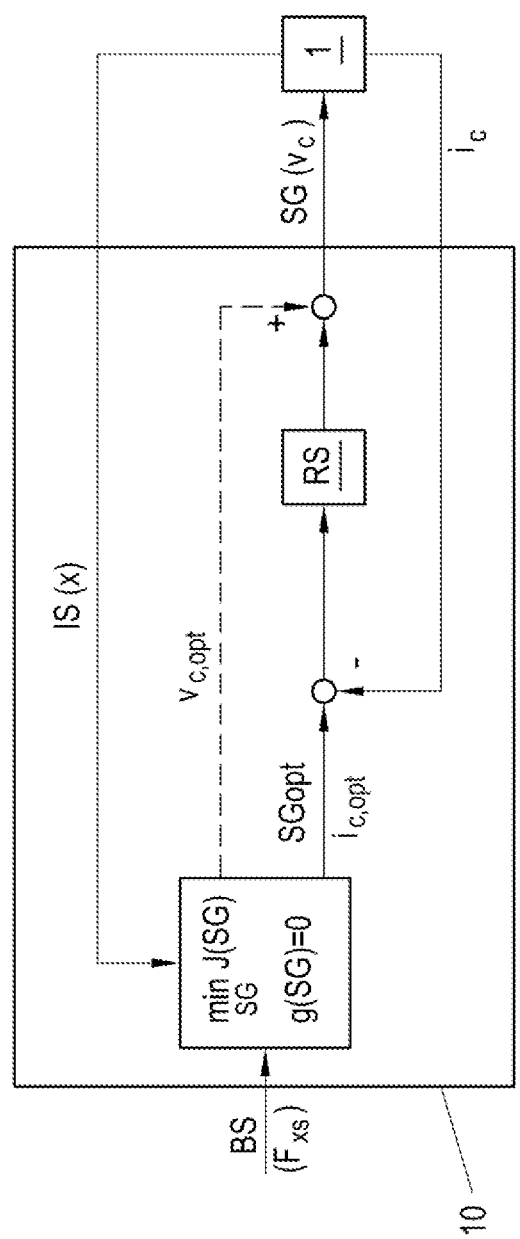

The present invention is described in greater detail below with reference to FIGS. 1 to 9, which show schematic and non-limiting advantageous embodiments of the invention by way of example. The following are shown:

FIGS. 1 and 2 a possible structure of a long-stator linear motor comprising a stator with teeth with drive coils and comprising a transport unit with drive magnets, FIGS. 3 and 4 a reluctance network of the stator, FIG. 5 a reluctance network of the rotor and the coupling thereof to the stator, FIG. 6 a control of the movement of a transport unit by optimizing a quality functional, FIGS. 7 and 8 possible embodiments of the control of the movement of the transport unit, and FIG. 9 an example of a movement characteristic map.

The invention is described using the example of a long-stator linear motor as an embodiment of a linear motor but can also be applied analogously to other embodiments of a linear motor, such as a planar motor or a short-stator linear motor.

FIG. 1 shows, by way of example, a section of a long-stator linear motor 1 in a very simplified manner. The long-stator linear motor 1 consists of a stator 2 and at least one transport unit 3, which can be moved along the stator 2 in the movement direction x. In the exemplary embodiment shown, the stator 2 is the primary part of the linear motor and the transport unit 3 is the secondary part. Usually, a plurality of transport units 3 (also different transport units) are moved simultaneously and independently of one another along the stator 2. The structural design and the geometry of the stator 2 and of the transport unit 3 do not play a role in the invention but naturally influence the structure of the model of the linear motor 1 described below. How the transport unit 3 is guided and held along the stator 2 is equally unimportant to the invention.

A plurality of drive coils 4 are arranged next to one another along the stator 2 in the movement direction x. A drive coil 4 is usually arranged on a stator tooth 5 made of a magnetically highly permeable material, such as iron, which teeth are connected to one another by a stator yoke 6. Between two stator teeth 5 with a drive coil 4, a secondary tooth 7 without a drive coil 4 may also be provided. However, the secondary teeth 7 may also be omitted. A drive magnet arrangement 8 with a number of drive magnets 9 is arranged on the transport unit 3. Drive magnets 9 of the drive magnet arrangement 8 arranged next to one another in the movement direction x are usually oppositely polarized. The drive magnet arrangement 8 faces the drive coils 4 and is separated therefrom by an air gap 14. The maintenance of the air gap 14 is generally ensured by the usually mechanical and/or magnetic guidance (not shown) of the transport unit 3 on the stator 2.

As already mentioned, the drive coils 4 in a planar motor would be arranged in a movement plane of the stator 2. The drive magnets 9 would likewise be arranged in a plane. In the case of a planar motor, there is usually no mechanical guidance of the transport unit 3, but the transport unit 3 is usually held magnetically in suspension.

For the movement of the transport unit 3, a number of drive coils 4 in the region of the drive magnet arrangement 8 of the transport unit 3 interact with the drive magnets 9 of the drive magnet arrangement 8. The number of drive coils 4 used for the movement of the transport unit 3 can be assumed to be known and can be defined but can also be dependent on the position of the transport unit 3 relative to the stator 2 and can however also be defined depending on the optimization described below. The number of drive coils 4 can thus also arise as a result of the optimization, the optimization thus determining how many drive coils 4 in the environment of the transport unit 3 are to be energized and how. These energized drive coils 4, hereinafter also referred to as active drive coils, are controlled by a control unit 10. Which of the drive coils 4 are the active drive coils naturally changes during the movement of the transport unit 3 relative to the stator 2.

However, it should be noted that all drive coils 4 in the region of the drive magnet arrangement 8 do not necessarily always have to be active drive coils. Situations are conceivable in which only certain drive coils 4 in the region of the drive magnet arrangement 8 are used as active drive coils. For example, a drive coil 4 may have failed and thus cannot be used for the movement of the transport unit 3. Nevertheless, the transport unit 3 can be moved with the other drive coils 4 in the region of the drive magnet arrangement 8 as active drive coils.

In order to avoid a failure of the long-stator linear motor 1 in the event of failure of a drive coil 4, provision may be made for the control unit 10 to simply ignore the failed drive coil 4. However, this can lead to a certain impairment of the movement of the transport unit 3, which may however be negligible in certain situations, for example in sections of the movement without accuracy requirements on the movement of the transport unit 3. The control unit 10 may however also compensate for the failure of a drive coils 4 with the remaining active drive coils in order to avoid the failure of the long-stator linear motor 1. For this purpose, it would merely be necessary to inform the control unit 10 which drive coil 4 has failed. This could also be very simply done in the context of the present invention, as explained below.

In order to establish a failure of a drive coils 4, a coil current or a coil voltage could be applied thereto. It could then be established by measuring a coil voltage or a coil current whether a drive coil 4 is short-circuited or open-circuited, which corresponds to a failure because the drive coil can no longer be actuated. This could occur continuously during operation of the long-stator linear motor 1, even during the control of the movement of the transport unit 3.

Drive coils 4 can also be arranged on both sides of the transport unit 3 as viewed in the movement direction x. In this case, the transport unit 3 can likewise have a drive magnet arrangement 8 on both sides as viewed in the movement direction x. In such a structure, forces acting on the transport unit 3 can thus be generated on both sides of the transport unit 3. However, this does not change the control according to the invention as described below.

The control unit 10 uses a movement setpoint variable BS, which is specified, for example, by a system control unit 11, for example via a data communication bus as indicated in FIG. 1. The system control unit 11 controls and monitors, for example, the simultaneous movement of several transport units 3 on the stator 2. In each time step of the control, usually in the ⅒ millisecond range, a manipulated variable SG for a number of or each active drive coil 4 involved in the movement of the transport unit 3 is determined by the control unit 10 on the basis of the movement setpoint variable BS with a control implemented thereon (for example in the form of control software running on processor-based hardware). However, a control unit 10 for each drive coil 4 may also be provided. The manipulated variables SG of the active drive coils 4 are usually not the same.

The manipulated variable SG may be a coil current iC or a coil voltage vC with which the drive coil 4 is energized. The coil current iC or the coil voltage vC can be generated for each involved drive coil 4 and applied to the drive coils 4 by a power electronics system (not shown), for example as described in EP 3 249 803 A1. Usually, the manipulated variable SG is a coil voltage vC, which is applied to the active drive coils 4.

In the case of a coil current iC as the manipulated variable SG a conversion into a coil voltage vC can also be provided, as explained below, or a current controller that adjusts the coil current iC can be provided. This can take place in the control unit 10 or also in the power electronics system.

The movement setpoint variable BS can be specified for each time step of the control, for example a setpoint position of the transport unit 3 along the stator 2, or a setpoint speed or also a setpoint force. However, the movement setpoint variable BS can also be determined in the control unit 10 itself, for example on the basis of a planned movement (e.g., as the course of the position or speed of the transport unit 3 over time or distance travelled) along the stator 2. This planned movement can be specified to the control unit 10 but can also be calculated in the control unit 10, for example in order to reach a specified setpoint position along the stator 2.

In order to control the movement of the transport unit 3, it may also be provided to determine an actual variable of the movement, for example an actual position, of the transport unit 3 along the stator 2, for example on the basis of known position sensors 13 (indicated in FIG. 1), which are arranged along the stator 2.

Usually, the necessary driving forces and/or driving torques to be impressed on the transport unit 3 are determined from the movement setpoint variable BS in an upstream movement controller for the transport unit 3 in each time step of the control so that the transport unit 3 carries out the desired and specified movement. The movement controller can be implemented in the control unit 10 but can also be an independent unit. The manipulated variables SG for the active drive coils 4 are then determined from the driving forces and/or driving torques to be impressed. The active drive coils 4 involved in the implementation of the movement are thus energized such that the driving forces and/or driving torques required for the specified movement are generated.

The control unit 10 can also take into account any failed drive coils 4 and determine the manipulated variables SG for the active drive coils 4 so that a failed drive coil 4 in the region of the drive magnet arrangement 8 is compensated in order to carry out the desired and specified movement. The electromagnetic field required for the movement of the transport unit 3 is thus generated with the active drive coils 4 excluding the failed coil.

This enables a method for operating a linear motor 1 comprising a stator 2, on which a plurality of drive coils 4 is arranged, and comprising a transport unit 3, which is moved along the stator 2 and on which a plurality of drive magnets 9 is arranged, wherein an electromagnetic field, which interacts with the drive magnets 9 of the transport unit 3 for moving the transport unit 3, is generated by energizing active drive coils 4 in the region of the drive magnets 9 of the transport unit 3. A control unit 10 determines manipulated variables SG, preferably coil currents ic or coil voltages vc, for the active drive coils 4. The active drive coils 4 are energized according to the determined manipulated variables SG in order to control the movement of the transport unit 3. This can take place in specified time steps of the control of the movement. The control unit 10 is aware of a failed drive coil 4 or itself detects a failed drive coil 4 in the region of the drive magnet arrangement 8. For moving the transport unit 3, the effect of the failed drive coil 4 is compensated by the remaining active drive coils 4. For this purpose, the control unit 10 generates the manipulated variables SG for the remaining active drive coils 4 so that for moving the transport unit 3 the failed drive coil 4 is compensated. This can be performed with an optimization as described below and claimed in the claims.

The control unit 10 and/or a movement controller can be microprocessor-based hardware on which control software is run. However, the control unit 10 and/or a movement controller can also be implemented as computer software that is installed and run on available computer hardware. However, the control unit 10 and/or a movement controller can also be designed as an integrated circuit, such as an application-specific integrated circuit (ASIC) or field programmable gate array (FPGA), on which a microprocessor can also be implemented. The control unit 10 can however also be designed as an analog circuit, for example as an analog computer. Combinations of these are also possible.

In order to control the movement of the transport unit 3, the manipulated variable SG, coil current $i_c$ or preferably the coil voltage $v_c$, are thus determined for each time step of the control for each active drive coil 4, with which the active drive coils 4 are energized in order to generate the magnetic fluxes required for the movement.

In order to determine the manipulated variable SG, such as the coil current $i_C$ or the coil voltage $v_c$, of the active drive coils 4, a quality functional J is used, which is a function f of at least one manipulated variable SG of the active drive coils 4 to be determined, i.e., J=f(SG), wherein SG is in each case a vector with the manipulated variables to be determined of the individual active drive coils 4 involved. Specifically, the quality functional J is a sum of a number k≥1 of quality terms $JT_k$ weighted with weighting factors $k_k$, i.e., $$J(SG) = \sum_k k_k \cdot JT_k(SG).$$

At least one, preferably each, quality term $JT_k$ is a function of a manipulated variable SG of the active drive coils 4. A quadratic function is preferably used since this has a global minimum and is therefore well-suited for optimization. The quality functional J and thus also a quality term $JT_k$ can however also be dependent on other variables of the linear motor 1, for example on a position of the transport unit 3 relative to the stator 2 or of magnetic variables (such as the magnetic flux) in the stator 2.

If control unit 10 is aware whether and which drive coil 4 has failed, this can be taken into account in the quality functional J in the vector of the manipulated variables SG. This would also automatically compensate for a failure of a drive coil 4.

This quality functional J(SG) of the control is optimized (maximized or minimized), generally minimized, in order to determine the manipulated variables SG for the active drive coils 4 involved, which manipulated variables are generated in the relevant time step in order to energize the drive coils 4. Optimization means that the manipulated variables SG that minimize or maximize the quality functional J(SG) are sought. These manipulated variables SG are also referred to as optimal manipulated variables $SG_{opt}$.

The optimization can be performed on-line, i.e., in each time step of the control, or also off-line. In off-line optimization, the manipulated variables SG to be set during the performance of the movement scenario can be calculated in advance for a specific specified movement scenario of the transport unit 3 (for example as a time curve of the position or speed of the transport unit over time or over distance travelled). For this purpose, the movement scenario can be discretized in certain time steps and the optimization can be performed in each of these time steps. Interpolation between the time steps may also be performed. The manipulated variables SG are thus present at any required time point of the movement of the transport unit 3, in particular in each time step of the control. Since the movement of a transport unit 3 in a transport system is usually planned in advance, the movement scenario is known. If the movement scenario is not known or only partially known, the actual movement of the transport unit 3 can be delayed so that sufficient information about the movement will be known again.

In the case of off-line optimization, movement characteristic maps can also be generated. During the movement of the transport unit 3 along the stator 2 at a specific speed, which corresponds to a specific driving force acting on the transport unit 3 in the movement direction, the drive magnets 8 of the transport unit 3 are moved past the drive coils 4. Thus, the coil voltages $v_C$ or coil currents $i_C$ to be impressed into the active drive coils 4 are repeated. This makes it possible to create off-line a movement characteristic map for the coil voltages $v_C$ or coil currents $i_C$ for a specific movement scenario in the form of a combination of position and driving force. During the movement of the transport unit 3, the required coil voltages $v_C$ and/or coil currents $i_C$ must then be read out in the movement characteristic map only as a function of the currently required driving force and the current position. Such movement characteristic maps can also be created for different quality functionals J(SG).

Mathematically, the optimization can generally be written as $$\min_{SG} J(SG)$$

(wherein the cost function J as mentioned can also be dependent on variables other than the manipulated variables SG).

The optimization can also take place taking into account a constraint g. The constraint g describes the physical laws of the linear motor 1. These laws are formulated in the form of a mathematical model of the linear motor 1, preferably likewise as a function of the manipulated variable SG and optionally of further variables (such as state variables) of the linear motor 1. The mathematical model can be a model that models the underlying physical laws of the linear motor 1, for example the relationship between the coil current $i_c$ or coil voltage $u_c$ and the magnetic variables, such as the magnetic flux. However, the mathematical model can also be a trained model, for example a local model network or a neural network. In general, the model simulates the response of the linear motor 1 in the form of an output variable or a state variable (both usually vectors), or also both, to an input variable (usually a vector). The input variable is usually the manipulated variable SG, for example a coil current $i_c$ or a coil voltage $u_c$. The output variable can, for example, be an acting driving force (propulsive force and/or normal force) or driving torque on the transport unit 3 but also a movement variable of the transport unit 3, such as a position along the stator 2, a speed in the movement direction x and/or normal direction y or an acceleration in the movement direction x and/or normal direction y. In the case of a planar motor, the driving forces can act in a movement plane, i.e., in an x-z plane. The output variable can also be a total current of the drive coils 4 involved (such as a q- or d-current). According to kinematic principles, the driving forces/driving torques and the movement variables are equivalent, or in other words, the resulting movement variables are the consequence of the acting forces/torques. The driving forces/driving torques correspond to a total current. The state variables, which describe the state of the long-stator linear motor 1, are, for example, the magnetic variables resulting from the acting input variable in the long-stator linear motor 1, such as the magnetic fluxes, magnetic potentials or voltages.

A failed drive coil 4 can also be formulated as an additional constraint g, for example in the form of a mathematical formulation for "drive coil with the number xy has failed." For example, this could be realized by a vector for all drive coils 4, said vector containing a binary value for each drive coil 4, wherein "0" means "failed," for example, and "1" means "not failed."

Mathematically, taking into account the constraint g, the optimization can generally be written as follows (wherein the cost function J and/or the constraint g, as mentioned, may also be dependent on variables other than the manipulated variables SG).

$$\min_{SG} J(SG)$$

$$g(SG) = 0$$

To solve such optimization problems, there is a plethora of known solution algorithms, such as the gradient method, Newton's method, evolutionary methods or sequential quadratic programming, to name but a few. However, the selection of the solution algorithm plays no role in the invention, but a method that is advantageous with regard to computing effort and computing time (in particular in the case of an on-line optimization) is naturally selected. What the solution methods have in common is that possible solutions of the optimization problem are sought, usually iteratively, until a defined termination criterion is achieved. The termination criterion can, for example, be a number of iterations or the undershooting of a limit value of the difference between the solutions of two successive iteration steps of the optimization problem, or also another termination criterion. The selection of the solutions (i.e., the manipulated variables SG) in each iteration step takes place by means of the rules of the solution method, wherein a suitable selection of the solution can be specified as the starting value in the first iteration step. In the gradient method, for example, the gradient of the quality functional (derivative of the quality functional with respect to the manipulated variable) is determined, and the manipulated variable for the next iteration step is selected along this gradient, wherein the step size from the current manipulated variable to the next manipulated variable is determined by the specified rules of the solution method.

Since the movement of the transport unit 3 along the stator 2 is to be controlled, the quality functional J(SG) contains a quality term JTk(SG), which evaluates, as explained in detail below, a deviation of a specified movement setpoint variable BS of the control of the movement of the transport unit 3 from an actual variable IS of the control, preferably a movement actual variable, which is dependent on the manipulated variable SG. As usual in a control, the relationship is such that the manipulated variable SG is to be generated for each time step of the control such that the actual variable IS, which is brought about by the manipulated variable SG, is to correspond as well as possible to a specified movement setpoint variable BS, usually expressed by a specific maximum control error. The actual variable IS is usually measured or determined from other measured variables.

In the case of linear motors 1 of a transport system, it is generally such that a transport unit 3 can be moved along the stator 2 over a certain route, also over several routes connected to one another via switches. A route is planned in advance, or even during movement, for each transport unit 3, which can also comprise the planning of a movement profile (movement variable, such as speed over time or distance travelled). Processing stations, in which an object being moved with the transport unit 3 is processed, may also be provided along the route. A transport unit 3 may also convey different or changing objects during the movement along the route, for example bottles that are filled. In short, the requirements on the movement of the transport unit 3 during movement along a route of the linear motor 1 can change.

In order to be able to map this in the control of the movement of the transport unit 3 in a simple manner, it is provided that there are at least two movement phases during the movement of the transport unit 3 along the route, wherein different quality functionals J(SG) are used in the movement phases. The quality functionals J(SG) can differ by the number k of quality terms $JT_k(SG)$ used and/or by the quality terms $JT_k(SG)$ used and/or by the weighting factors $k_k$. The control of the movement of the transport unit 3 in the various movement phases can thus be adapted in a situation-related manner and flexibly to different requirements. It is even possible to do so during the operation of the linear motor 1.

For example, in a first movement phase, in which no particular accuracy is required in the control of the movement of the transport unit 3, energy-optimal operation of the long-stator linear motor 1 can be sought, while in a second movement phase, in which an accurate control of the movement is required, an accurate control of the driving forces may be desired. For example, in the region of a switch, the control of the movement of the transport unit 3 can take place with a higher weighting of the control of the normal forces (in the y-direction transverse to the movement direction x). Outside the switch, however, with higher energy efficiency.

A quality term $JT_k(SG)$ evaluates the deviation of the setpoint variable BS of the control from the actual variable IS of the control, preferably as a square of the deviation, i.e., for example, $JT_k(SG)=k_e(BS-IS(SG))^2$ or $JT_k(SG)=k_e(BS-IS(SG))$, with the weighting factor $k_e$. Such a quality term $JT_k(SG)$ can be used in particular in an on-line optimization where the current actual variables IS are available (for example by measurement). The actual variable IS can be measured, for example with position sensors 13, but can also be determined from existing known measurement variables, for example with an observer, wherein the mathematical model of the linear motor 1 can also be the basis for the observer. In the case of an off-line optimization, the actual variable IS can be determined from the mathematical model (i.e., output variable or state variable of the model) of the linear motor 1. Since the actual variable IS is dependent on the manipulated variable SG, this quality term of $JT_k(SG)$ is also indirectly dependent on the manipulated variable SG. With this, for example, the deviation of a setpoint speed from an actual speed or the deviation of a setpoint position from an actual position or the deviation of a setpoint driving force (or also torque) from an actual driving force (or also driving torque) or the deviation of a setpoint magnetic flux from an actual flux can be evaluated. This quality term $JT_k(SG)$ accordingly evaluates the control error. Since the position and the speed are naturally a consequence of the driving force and driving torque acting on the transport unit 3, and the driving force and driving torque are dependent on the magnetic flux, the deviations mentioned are equivalent.

The driving force acting on the transport unit 3 or the acting driving torque can be obtained from the mathematical model of the constraint g(SG), wherein the driving force can be a propulsive force (also in an x-z movement plane) and/or a normal force but also a force in the z-direction. In general, the driving torque can be a torque about one of the axes x, y, z. The driving force and the driving torque can be a vector with components of the different axes x, y, z. The actual driving force or the actual driving torque can then be calculated from the model. The setpoint driving force or the setpoint driving torque is determined, for example, from the movement setpoint variable BS of the control or can also be specified directly as a setpoint variable. Preferably, a movement controller is implemented, which determines the required setpoint driving force or the required setpoint driving torque from the movement setpoint variable BS and a current movement actual variable IS (such as an actual position or actual speed) on the basis of an implemented control rule (e.g., a PI or PID controller).

Another quality term $JT_k(SG)$ could, for example, evaluate the electrical power required for the movement of the transport unit 3. Since the coil currents $i_c$ or coil voltages $v_c$ can be used as the manipulated variable SG, the electrical power can be easily determined from the manipulated variables SG. Since the coil currents $i_c$ or coil voltages $v_c$ can be used as the manipulated variable SG, a suitable quality term $JT_k(SG)$ for evaluating the power is the square of the Euclidean norm $\|\cdot\|_2^2$ of the manipulated variables SG (which can be combined into a vector) of the involved energized active drive coils 4, i.e., for example, $JT_k(SG)=k_i \cdot \|SG\|_2^2$, with the weighting factor $k_i$. The Euclidean norm is known to be the root of the sum of the squares of the components of the vector of the manipulated variables SG. The square thereof is consequently the sum of the squares of the components of the vector. Since the electrical power is proportional to the square of the electrical current or of the electrical voltage, the square of the Euclidean norm $\|\cdot\|_2^2$ evaluates the implemented electrical power, and thus also the energy efficiency.

Another quality term $JT_k(SG)$ could be the sum $SG_\Sigma$ of the values of the manipulated variables SG of the drive coils 4 involved in the movement of the transport unit 3, also as a square of the sum, i.e., for example, $JT_k(SG)=k_\Sigma SG_\Sigma^2$ or $JT_k(SG)=k_\Sigma SG_\Sigma$, with the weighting factor $k_\Sigma$. It can thus be achieved that the sum of the manipulated variables is evaluated. The smaller the sum of the manipulated variables SG, the lower the load on the power electronics system for generating the manipulated variables SG. This can be advantageous for the long-term operation of the long-stator linear motor 1 because the power electronics system is loaded as uniformly as possible. In particular, the thermal load on the power electronics system or the circuit components in the power electronics system can thus also be reduced because of the smaller losses. It can thus also be achieved that the stator 2 is heated less, which can also simplify or eliminate cooling of the stator 2.

A possible quality functional J(SG) could thus be defined as follows.

$$J(SG)=(k_i\|SG\|_2^2+k_\Sigma SG_\Sigma^2+k_e(BS-IS(SG))^2)$$

If the propulsive force $F_x$ and the normal force $F_z$ are controlled, the quality functional J(SG) can, for example, be written as follows.

$$J(SG)=(k_i\|SG\|_2^2+k_\Sigma SG_\Sigma^2+k_x(F_{xS}-F_x(SG))^2+k_y(F_{yS}-F_y(SG))^2)$$

In the case of a planar motor, a driving force $F_z$ can also act in the z-direction and a corresponding quality term $JT_k$ can also be provided in the quality functional J(SG). Therein, $F_{xS}$, $F_{yS}$, $F_{zS}$ are the specified setpoint values of the forces and $F_x(SG)$, $F_y(SG)$, $F_z(SG)$ are the actual values of the forces determined using the mathematical model. Naturally, the quality functional J(SG) can also include only the propulsive force $F_x$, $F_z$ or only the normal force $F_y$. In the same way, additional or other components of the driving force or also of the driving torque can naturally also be taken into account.

It is obvious that by changing the weighting factors $k_k$, for example $k_i$, $k_\Sigma$, $k_e$, $k_x$, $k_y$, $k_z$, and/or by adding or removing specific quality terms $JT_k(SG)$, for example $\|SG\|_2^2$, $SG_{93}{}^2$, $(F_{xS}-F_x(SG))^2$, $(F_{yS}-F_y(SG))^2$, the control objective and the behavior of the control can be changed in a simple manner. Naturally, quality terms $JT_k(SG)$ other than or in addition to the ones described above are also possible.

By (on-line or off-line) optimization of the quality functional J(SG) with respect to the manipulated variables $SG_{opt}$, optimal manipulated variables $SG_{opt}$ can consequently be determined, which minimize (or maximize) the quality functional J(SG). These optimal manipulated variables $SG_{opt}$ are implemented on the linear motor 1 in each time step of the control of the movement of the transport unit 3, as schematically illustrated in FIG. 6. The movement setpoint variable BS is, for example, a specification for a desired propulsive force $F_x$, $F_z$ and normal force $F_y$, or a position of the transport unit 3 to be approached or a speed of the transport unit 3 to be set. Compliance with this movement setpoint variable BS is, for example, ensured by the quality terms $(F_{xS}-F_x(SG))^2$, $(F_{yS}-F_y(SG))^2$, $(F_{zS}-F_z(SG))^2$, $(BS-IS(SG))^2$, or other or additional components of the driving force or the driving torque, wherein the accuracy of compliance can be influenced by means of the associated weighting factors $k_x$, $k_y$, $k_z$, $k_e$. The other quality terms would not have to be present at all or could be weighted lower in comparison. If high accuracy is not required, the quality term $\|SG\|_2^2$, which characterizes the electrical power, in particular power loss, could be weighted higher or added in order to enable the most energy-saving operation possible. The quality functional J(SG) is thus changed in different movement phases during the movement of the transport unit 3. The different movement phases with the different quality functionals J(SG) can be configured in advance or can also first be defined during the movement, for example by the system control unit 11.

By providing further quality terms $JT_k$, other aspects of the operation of the linear motor 1 can naturally also be taken into account.

With reference to FIG. 6 and FIG. 7, possible exemplary embodiments for the implementation of the determined optimal manipulated variables $SG_{opt}$ on the linear motor 1 or on the active drive coils 4 of the linear motor 1 are described.

In the example according to FIG. 7, the optimal manipulated variable $SG_{opt}$, for example coil voltages $v_{c,opt}$ of the active drive coils 4, determined by the optimization is directly generated by the power electronics system (not shown) and applied to the drive coils 4. In this example, the movement setpoint variable BS is a setpoint position $x_{set}$ of the transport unit 3. This setpoint position $x_{set}$ can also be used in the optimization, for example for a cost term $JT_k(SG)=k_e(BS-IS(SG))^2$. For this purpose, an actual value IS of the movement variable can also be determined (for example measured or calculated), for example a current actual position x in this case, and can be used in the optimization. From the movement setpoint variable BS and the actual value IS of the movement variable, a driving force $F_{xS}$ is determined in a movement controller RB, in this example a position controller, in order to minimize the control error between actual value IS and movement setpoint variable BS in the current time step of the control. This driving force $F_{xS}$ can, for example, be used for a cost term $(F_{xS}-F_x(SG))^2$ in the optimization. The setpoint value $F_{xS}$ of the driving force could, however, also be specified as the movement setpoint variable BS. In this case, the movement controller RB could also be implemented separately from the control unit 10, for example as microprocessor-based hardware with software running thereon or as an integrated or analog circuit. In the optimization, in particular in the mathematical model of the linear motor 1 for the constraint g(SG) of the optimization, an actual value of the coil currents $i_c$ of the active drive coils 4, which can be measured or determined from other known variables, can also be used. This embodiment of the control unit 10 is suitable in particular for on-line optimization because current actual values are captured on the linear motor 1 in each time step of the control, for example an actual position x and/or an actual value of the coil current $i_c$ (or also the coil voltage $v_c$). However, this embodiment can also be used for an off-line optimization.

In the exemplary embodiment according to FIG. 8, the determined optimal manipulated variables SGopt are not directly generated and implemented but are adjusted on the linear motor 1. The optimal manipulated variable SGopt determined with the optimization are, for example, the optimal coil currents ic,opt of the active drive coils 4. These optimal coil currents ic,opt are used in the control unit 10 as control variables in a manipulated variable controller RS. From the optimal manipulated variables SGopt, here the coil currents ic,opt, and current actual values of the manipulated variable SG, here the coil currents ic of the active drive coils 4, specifically from the deviations thereof, the manipulated variable controller RS determines, on the basis of an implemented control rule (e.g., a PI or PID controller), the manipulated variable SG, here coil voltages vc of the active drive coils 4, in each time step of the control. These manipulated variables SG, here coil voltages vc, are generated and applied to the drive coils 4 by a power electronics system (not shown). Naturally, such a manipulated variable controller RS exists for each of the active drive coils 4. The manipulated variable controller RS can be designed as software, microprocessor-based hardware or as an integrated or analog circuit. However, the manipulated variable controller RS could also be part of the power electronics system. In addition, optimal coil voltages vc,opt could also be determined as optimal manipulated variables SGopt in the optimization. These optimal coil voltages vc,opt could then be used as feedforward control of the manipulated variable controller RS, as indicated by dashed lines in FIG. 8. The optimal coil voltages vc,opt and the coil voltages determined with the manipulated variable controller RS are added up to the manipulated variable SG, the coil voltages vC to be applied. In this exemplary embodiment too, a movement controller RB could be provided analogously to the embodiment according to FIG. 7 in order to determine the driving force FxS from a movement setpoint variable BS, for example a setpoint position.

The embodiment of the control unit 10 according to FIG. 8 is in particular suitable for off-line optimization but could also be used for on-line optimization.

In the case of off-line optimization, movement characteristic maps 12 created in advance could be used, which map the driving force Fx (and/or Fy, Fz) and a position x of the transport unit 3 relative to the drive coils 4 onto optimal manipulated variables SGopt, for example coil currents ic,opt and/or coil voltages vc,opt, as already explained above. FIG. 9 shows, by way of example, such a movement characteristic map 12, which maps the position x of the transport unit 3 relative to a plurality of active drive coils 4, and a driving force Fx to the coil currents ic of the active drive coils 4. In this case, movement characteristic maps 12 for differently defined quality functionals J(SG) can naturally be used in order to determine the optimal manipulated variables SGopt in different movement phases. The movement characteristic maps 12 can be stored in the control unit 10 or in external memory units. For the control of the movement of the transport unit 3, the optimal manipulated variables $SG_{opt}$ must then only be read out in the correct movement characteristic map. Very little computing capacity is required for this purpose.

The movement characteristic maps 12 can be stored in the form of tables. Interpolation between the table entries could then be performed. However, it is also possible to adapt a mathematical function, for example a polynomial of a specific order, to the determined entries in a movement characteristic map 12, for example by means of a curve-fitting method. In this case, only the specific mathematical function would have to be stored for the movement characteristic map 12 and interpolation would no longer be necessary.

Equivalent controls can naturally be realized for other movement directions, for example in the y- or z-direction.

A variable of a quality term $JT_k(SG)$, for example $F_x(SG)$, $F_y(SG)$ or $F_z(SG)$ in $(F_{xS}-F_x(SG))^2, (F_{yS}-F_y(SG))^2, (F_{zS}-F_z(SG))^2$, can be determined using a mathematical model of the linear motor 1. In this case, the manipulated variable SG serves as an input variable of the model and the variable is an output variable or state variable of the model.

The mathematical modeling of the linear motor 1 for the constraint g(SG) of the optimization and/or for the determination of a variable of a quality term $JT_k(SG)$ on the basis of given physical conditions can be carried out in different ways. A common and sufficiently known model of linear motor 1 is a dq-model or a finite element (FEM) model.

A dq-model is, for example, described in the document cited at the beginning by Khong, P. C., et al. but also in Deng, Z, et al., *"Forces and parameters of permanent magnet linear synchronous machines,"* IEEE Transactions on Magnetics, Vol. MAG-23, No. 1, January, 1987 or in Chapter 4 of Boldea, I., et al., *"Linear Electric Actuators and Generators,"* Cambridge University Press, 1997. The dq-model describes the relationship between the currents, voltages and magnetic fluxes in the dq-coordinate system and the manipulated variables SG (coil currents $i_c$ and coil voltages $v_c$) and also comprises equations for the acting forces in the movement direction x (driving force) and in the transverse direction y (normal force), and also of other force or torque components.

Another advantageous possibility for modeling the behavior of the linear motor 1 is by means of a reluctance network with which the relationship between coil currents $i_c$ or coil voltages $v_c$ and the magnetic fluxes, and also the generated driving forces, propulsive force and/or normal force, and driving torques can be described. The advantage of modeling by means of a reluctance network is that all forms of the motor variables are taken into account and not just the sinusoidal fundamental waves. As a result, non-linear effects, such as saturation, but also effects such as a cogging force can be modeled systematically but nevertheless with sufficient abstraction so that the model can also be calculated on-line.

The use of a reluctance network model of the linear motor 1 for the control of the movement of a transport unit 3, also with other control methods as described above, is in its own right novel and inventive. For example, the reluctance network model could be used to create an observer to estimate actual values of the magnetic fluxes and/or of the forces which are then used in a control.

A reluctance network describes the linear motor 1 as a network of reluctances R (magnetic resistances), permeances G (magnetic conductance values) and magnetic voltage sources. A reluctance as is known describes the relationship between a magnetic voltage and a magnetic flux Φ. The permeance G is the reciprocal of the reluctance R. The reluctance R of a magnetic conductor of length 1 and cross-section A is given by $$R = \frac{l}{\mu_r \mu_0 A}.$$

where $\mu_0$ is the permeability of vacuum and $\mu_r$ is the relative permeability of the material of the magnetic conductor.

Modeling with a reluctance network is described using the example of a long-stator linear motor as a linear motor 1 on the basis of a structure of the long-stator linear motor as shown in FIG. 2. In the case of other structural designs or other linear motors 1, such as in the case of a planar motor, corresponding changes can result in the reluctance network and in the model.

The stator 2 is modeled as a reluctance network $RN_S$ with i=1, ..., n teeth (stator teeth 5 and secondary teeth 7). These teeth do not have to be all of the teeth present on the stator 2, but only the teeth interacting with the transport unit 3, for example. Usually, a number of drive coils 4 are selected, which are energized for the purpose of moving the transport unit 3. This gives the number n of teeth, which are modeled with the reluctance network $RN_S$. On the j=1, ..., $n_C$ stator teeth 5, where $n_C \leq n$, drive coils 4 are arranged, between which the secondary teeth 7 are arranged. In the case of no secondary teeth 7, the reluctance network $RN_S$ is simplified accordingly. The used dimensions of the stator 2 and of the transport unit 3 are specified in FIG. 2 and can be assumed to be known for a linear motor 1.

Each stator tooth 5 is modeled by a differential reluctance (reluctance per unit length)

$$R'_c(\Phi_i) = \frac{1}{\mu_0 \mu_r(\Phi_i) A_c},$$

with the cross-sectional area $A_c = w_c \cdot b_s$ of the stator tooth 5. By means of the non-linear modeling of the material by the relative permeability $\mu_r$ dependent on the magnetic flux Φ, the magnetic saturation of the stator tooth 5 can be taken into account. Analogously, each secondary tooth 7 is modeled by a differential reluctance $$R'_a(\Phi_i) = \frac{1}{\mu_0 \mu_r(\Phi_i) A_a},$$

with the cross-sectional area $A_a = w_a \cdot b_s$ of the secondary tooth 5. The coupling of the teeth through the tooth interspace of width $w_{ca}$ between two adjacent teeth is modeled by a differential permeance $$G' = \frac{\mu_0 b_s}{w_{ca}}.$$

The j drive coils 4 can be modeled as differential magnetic voltages $$u'_{c,j} = \frac{N_c}{l_s} i_{c,j},$$

where $N_c$ denotes the number of windings of the drive coil 4 and $l_s$ denotes the length of the tooth in the y-direction (i.e., transversely to the movement direction x).

A differential section dy of the stator 2 in the y-direction can then be modeled with a reluctance network $RN_S$ of the stator 2 as shown in FIG. 3. Each tooth therein forms a branch of the reluctance network of the stator $RN_S$, wherein the branches are connected by the differential permeances G' so that nodes of the reluctance network $RN_S$ form. Therein, $\Phi_i(y)$ denotes the magnetic flux in the i-th tooth (stator tooth 5 or secondary tooth 7) and $\varphi_i(y)$ denotes the magnetic potential in the y-direction along the i-th tooth.

Thus, at each of the n nodes of the reluctance network of the stator $RN_S$, a node sum of the magnetic fluxes $\Phi_i(y)$ and of the magnetic potential $\varphi_i(y)$ along the tooth in the y-direction can be formulated, leading to the following 2n equation systems as system equations.

$\Phi_1(y)-\Phi_1(y+dy)-G'dy(\varphi_1(y+dy)-\varphi_2(y+dy))=0$ $\Phi_2(y)-\Phi_2(y+dy)+G'dy(\varphi_1(y+dy)-\varphi_2(y+dy))-G'dy(\varphi_2(y+dy)-\varphi_3(y+dy))=0$

...

$\Phi_n(y)-\Phi_n(y+dy)-G'dy(\varphi_{n-1}(y+dy)-\varphi_n(y+dy))=0$ $\varphi_1(y)-\varphi_1(y+dy)-R'_a dy\Phi_1(y)=0$ $\varphi_2(y)-\varphi_2(y+dy)-R'_c dy\Phi_2(y)+u'_{c,1}dy=0$

...

$\varphi_n(y)-\varphi_n(y+dy)-R'_a dy\Phi_n(y)=0$

The local, differential description of the flux or potential variables makes it possible, in particular, to take into account non-negligible leakage fluxes in the tooth interspace.

Dividing the equations by dy and taking into account $dy \to 0$ yields the system equations $$\frac{d}{dy}\begin{bmatrix}\Phi(y)\\\varphi(y)\end{bmatrix}=\begin{bmatrix}0 & A_1\\A_2(\Phi) & 0\end{bmatrix}\begin{bmatrix}\Phi(y)\\\varphi(y)\end{bmatrix}+\begin{bmatrix}0\\B\end{bmatrix}i_c.$$

The n magnetic fluxes and magnetic potentials are combined in the vectors $\Phi(y)$ and $\varphi(y)$, i.e., $\Phi=[(\Phi_1\ \Phi_2\ \ldots\ \Phi_n]^T$ and $\varphi=[\varphi_1\ \varphi_2\ \ldots\ \varphi_n]^T$. The system matrices $A_1$ and $A_2$ result as $$A_1=\begin{bmatrix}-G' & G' & 0 & \cdots & & 0\\G' & -2G' & G' & \cdots & & 0\\0 & G' & -2G' & G' & 0 & \cdots & 0\\\vdots & & & \ddots & & \vdots\\0 & \cdots & & & \cdots & 0 & G' & -G'\end{bmatrix}$$

and $A_2(\Phi)=\text{diag}[-R'_a(\Phi_1), -R'_c(\Phi_2), \ldots, -R'_a(\Phi_n)]$ (wherein diag denotes a diagonal matrix) and the input matrix B results as $$B=\frac{N_c}{l_s}\begin{bmatrix}0 & 0 & \cdots & 0\\1 & 0 & \cdots & 0\\0 & 0 & \cdots & 0\\0 & 1 & \cdots & 0\\\vdots & \vdots & \ddots & \vdots\\0 & 0 & \cdots & 0\end{bmatrix}.$$

In order to fully model the stator 2, the terminations at $y=l_s$ (i.e., the stator yoke 6) and at $y=0$ (i.e., at the transition to the air gap) must still be modeled as a boundary condition, as explained with reference to FIG. 4. The stator yoke 6 at $y=l_s$ between two adjacent teeth is modeled with a linear permeance $G_{sy}$, with $$G_{sy}=\mu_0\mu_{ry}\frac{2A_{sy}}{w_a+w_c+2w_{ca}}.$$

where $\mu_{ry}$ is the relative permeability of the stator yoke 6 assumed to be constant and $A_{sy}=b_s\cdot l_j$ is the cross-sectional area of the stator yoke 6. At $y=0$, the teeth are coupled by leakage permeances $G_{s0}$, which can, for example, be modeled with $$G_{s0}=\frac{\mu_0 b_s}{\pi}\ln\left(\frac{2l_g}{w_{ca}}\right).$$

The linear permeances $G_{sy}$ and the leakage permeances $G_{s0}$ again connect the branches of the reluctance network of the stator $RN_S$ to form further nodes in the reluctance network of the stator $RN_S$. The magnetic flux $\Phi_\Sigma=[(\Phi_{\Sigma 1}\ \Phi_{\Sigma 2}\ \ldots\ \Phi_{\Sigma n}]^T$ denotes the magnetic flux of the drive magnets 9 of the transport unit 3 that flows into the teeth of the stator 2, i.e., the magnetic flux in the air gap.

With the same procedure as described above, equation systems t,? with the matrix $$T_L^\varphi=\begin{bmatrix}-1 & 1 & 0 & \cdots & & 0\\1 & -2 & 1 & \cdots & & 0\\0 & 1 & -2 & 1 & 0 & \cdots & 0\\\vdots & & & \ddots & & \vdots\\0 & \cdots & & & \cdots & 0 & 1 & -1\end{bmatrix}$$

are again obtained as boundary conditions for $y=l_s$ and $y=0$ an supplement the system equations.

If the material of the teeth of the stator 2 is assumed to be magnetically linear, the dependence of the reluctances $R'_a$ and $R'_c$ on the magnetic flux $\Phi$ drops out and an analytical solution for the above differential system equations can be given.

The linked fluxes $\psi_c=[\psi_{c1}\ \psi_{c2}\ \ldots\ \psi_{cn_c}]^T$ in the $j=1, \ldots, n_c$ stator teeth 5 of the stator 2 then result as $$\psi_c=\frac{N_c}{l_s}T_c^\psi\Phi(y)dy.$$

In the integral, the matrix $T_c^\psi=[e_2\ e_4\ \ldots\ e_{n-1}]^T$ with the i-th unit vectors $e_i$ selects the magnetic fluxes associated with each stator tooth 5 in $\Phi(y)$.

If, on the other hand, the material is non-linear and magnetic saturation occurs, an analytical solution is not possible. In this case, approximation methods for solving the differential equations of the system equations can be used.

For example, the i-th magnetic flux $\Phi_i$ and the i-th magnetic potential $\Phi_i$ in the teeth can be approximated by means of approximation polynomials $g_j(y)$ with the coefficients $\hat{\Phi}_{ij}$ and $\hat{\varphi}_{ij}$ via a number N of interpolation nodes along the length $l_s$ (in the y-direction) of the teeth, in the form $$\Phi_i(y) \approx \sum_{j=0}^{N}\hat{\Phi}_{ij}g_j(y)=g^T(y)\hat{\Phi}_i$$

-continued $$\varphi_i(y) \approx \sum_{j=0}^{N} \hat{\varphi}_{ij} g_j(y) = g^T(y)\hat{\varphi}_i.$$

By suitable selection of the approximation polynomials $g_j(y)$, the system of non-linear differential equations in the system equations can be transformed into a solvable system of non-linear algebraic equations. One possible selection of approximation polynomials $g_j(y)$ are Lagrange interpolation polynomials of the form $$g_j(y) = \prod_{k=0, k \neq j}^{N} \frac{y - y_k}{y_j - y_k}$$

where $j=0, \ldots, N$. The transformation results by differentiation of the approximation polynomials $g_j(y)$ with respect to y and evaluation at the N supporting points. A constant differentiation matrix D is thus obtained from $$\frac{d}{dy} g^T(y)\hat{\Phi}_i = D\hat{\Phi}_i \text{ or } \frac{d}{dy} g^T(y)\hat{\varphi}_i = D\hat{\varphi}_i.$$

The matrix D thus has the entries $$d_{ij} = \left(\frac{d}{dy} g_j(y)\right)_{y=y_i}.$$

The system of non-linear algebraic equations as system equations then follows as $$\begin{bmatrix} \tilde{D} & 0 \\ 0 & \tilde{D} \end{bmatrix} \begin{bmatrix} \hat{\Phi} \\ \hat{\varphi} \end{bmatrix} - \begin{bmatrix} 0 & \tilde{A}_1 \\ \tilde{A}_2(\hat{\Phi}) & 0 \end{bmatrix} \begin{bmatrix} \hat{\Phi} \\ \hat{\varphi} \end{bmatrix} + \begin{bmatrix} 0 \\ \tilde{B} \end{bmatrix} i_c = 0$$

where $\tilde{D}=\text{diag}[D \ D \ \ldots \ D]$, $\hat{\Phi}=[\hat{\Phi}_1 \ \hat{\Phi}_2 \ \ldots \ \hat{\Phi}_n]$ and $\hat{\varphi}=[\hat{\varphi}_1 \ \hat{\varphi}_2 \ \ldots \ \hat{\varphi}_n]$. The transformed system matrices result as $\tilde{A}_2(\hat{\Phi})=-\text{diag } [\tilde{R}_a(\hat{\Phi}_1) \ \tilde{R}_c(\hat{\Phi}_2) \ \ldots \ \tilde{R}_a(\hat{\Phi}_n)]$ with $\tilde{R}_a(\hat{\Phi}_i)=-\text{diag } [R'_a(\hat{\Phi}_{i1}) \ R'_a(\hat{\Phi}_{i2}) \ \ldots \ R'_a(\hat{\Phi}_{iN})]$ and $\tilde{R}_c(\hat{\Phi}_i)=-\text{diag } [R'_c(\hat{\Phi}_{i1}) \ R'_c(\hat{\Phi}_{i2}) \ \ldots \ R'_c(\hat{\Phi}_{iN})]$, as well as $\tilde{A}_1 = A_1 \otimes I$ with the unit matrix I and $\tilde{B} = B \otimes 1$ with $1=[1 \ 1 \ \ldots \ 1]^T$ and the Kronecker product $\otimes$.

The equations for the boundaries can also be transformed in this way, which results in the transformed equations $$T_L \hat{\Phi} + G_{sy} T_L^{\varphi} T_L \hat{\varphi} = 0$$

$$-T_0 \hat{\Phi} + \Phi_\Sigma + G_{s0} T_L^{\varphi} T_0 \hat{\varphi} = 0$$

with the selection matrices $T_L$ and $T_0$, which select the entries of $\hat{\Phi}$ and $\hat{\varphi}$ at the boundary interpolation points (y=0 and $l_s$).

Thus, an approximation of the linked fluxes $\psi_c = [\psi_{c1} \ \psi_{c2} \ \ldots \ \psi_{cn_c}]^T$ can also be expressed as a function of the approximated magnetic fluxes $\hat{\Phi}$, which can generally be specified as $\psi_c = W\hat{\Phi}$, wherein the matrix W results from the selection of the approximation polynomials $g_j(y)$ and the N interpolation points.

In order to determine the magnetic flux generated by the drive magnets 9 of the transport unit 3 in the air gap, the air gap and the transport unit 3 are also modeled with a reluctance network of the rotor $RN_L$ as explained with reference to FIG. 5.

The transport unit 3 is coupled to the stator 2 by air gap permeances $G_{a,ij}$, with the subscript $i=1, \ldots, n$ for the number of teeth and the index $j=1, \ldots, p$ for the number of drive magnets 9 on the transport unit 3. The stator 2 is represented by the magnetic voltages $u_s = [u_{s,1} \ u_{s,2} \ \ldots \ u_{s,n-1}]^T$, which result from the magnetic potentials $\varphi$ at the edge of the stator 2 at y=0. With the approximation explained above, the magnetic voltages result, for example, from $u_s = T_s^\varphi T_0 \hat{\varphi}$ with the matrix $$T_s^\varphi = \begin{bmatrix} 1 & -1 & 0 & \cdots & 0 \\ 0 & 1 & -1 & 0 & 0 \\ \vdots & & \ddots & \ddots & \vdots \\ 0 & \vdots & & 0 & 1 & -1 \end{bmatrix}$$

and the selection matrix $T_0$ explained above.

The drive magnets 9 are, for example, permanent magnets, which are described by voltage sources with constant magnetic voltages $u_{msj} = H_c l_m$, with the thickness $l_m$ of the permanent magnets and the magnetic coercivity $H_c$ known for the permanent magnets used, and a linear permeance $$G_m = \frac{A_m \mu_0 \mu_{rm}}{l_m}.$$

where $A_m$ is the known cross-sectional area of the permanent magnets and $\mu_{rm}$ is the known constant relative permeability of the permanent magnets. Another model, even with non-constant magnetic voltages, can be used for other drive magnets 9. The magnet yoke connecting the drive magnets 9 to the transport unit 3 is described with a linear permeance $$G_b = \frac{A_t \mu_0 \mu_{rt}}{w_t}.$$

with the known cross-sectional area $A_t$ and the known constant relative permeability $\mu_{rt}$ and the distance $w_t$ between two drive magnets 9 (for example center-to-center as in FIG. 2). The leakage flux at the end of the transport unit 3 facing the stator 2 is described by leakage permeances $$G_{ml} = \frac{\mu_0 b_s}{\pi} \ln\left(\frac{2l_g}{w_{ml}}\right).$$

with the width $w_{ml}$ of the interspace between two drive magnets 9. Each drive magnet 9 accordingly forms branches of the reluctance network of the rotor $RN_L$ with the linear permeance $G_m$ and with the magnetic voltage $u_{msj}$ of a magnetic voltage source, which are connected at the ends of the branches by the leakage permeances $G_{ml}$ at the air gap and the linear permeances at the magnet yoke to form nodes of the reluctance network of the rotor $RN_L$.

The nodes at the air gap are linked to further branches of the reluctance network of the rotor $RN_L$, in which air gap permeances $G_{a,ij}$ are arranged. Each of the p drive magnets 9 is connected via a respective air gap permeance $G_{a,ij}$ to each of the n teeth taken into account in the reluctance network of the stator $RN_S$. The branches with the air gap permeances $G_{a,ij}$ are connected by voltage sources to the magnetic voltages $u_s$, which represent the stator 2, to respectively form further nodes of the reluctance network of the rotor $RN_L$.

The air gap permeances $G_{a,ij}(x_s, y_s)$, which describe the magnetic coupling between the stator 2 and the transport unit 3, are dependent on the position $x_s$, $y_s$ of the transport unit 3 in the movement direction x and in the transverse direction y relative to the stator 2. Each drive magnet 9 is magnetically coupled to each considered tooth of the stator 2, or in other words, each drive magnet 9 contributes to the magnetic flux $\Phi_\Sigma$ flowing into a tooth. The air gap permeances $G_{a,ij}(x_s, y_s)$ can be assumed to be known, for example in that they are determined in advance by means of measurement technology or from simulation calculations. For this purpose, it is only necessary to determine the air gap permeances $G_{a,ij}(x_s, y_s)$ of a drive magnet 9 as a function of the position $x_s$, $y_s$ relative to a stator tooth 5. If secondary teeth 7 are used, then also relative to a secondary tooth 7. The air gap permeances $G_{a,ij}(x_s, y_s)$ can then be stored in the control unit 10, for example in tabular form, as a mathematical formula or as characteristic maps.

It would also be possible to map the magnetic coupling between two adjacent transport units 3 in the reluctance network of the rotor $RN_L$. Such a dependence would thus also be taken into account by the control.

In order to derive an equation system of independent equations from the magnetic reluctance network $RN_L$ of the air gap and the transport unit 3, different procedures can be used. The use of the well-known graph theory is suitable as a possible approach, as explained by way of example below. The use of graph theory is advantageous because it offers a system for formulating and solving the equations with respect to the independent variables.

The topology of the reluctance network of the rotor $RN_L$ (FIG. 5) is subdivided into a tree and a co-tree. In this case, the network of the tree connects all nodes without forming a mesh (a circuit closed via branches), and the co-tree comprises all elements that are not part of the tree. The selection of the tree is substantially free, but all magnetic voltage sources are preferably located in the tree. A suitable choice is, for example, the combination of all air gap permeances $G_{a,ij}(x_s, y_s)$ except for the last air gap permeance $G_{a,np}$ and the leakage permeances $G_{ml}$ in the co-tree. The magnetic fluxes $\Phi_t$ of the tree and $\Phi_c$ of the co-tree can then be combined in the vectors $\Phi_t^T = [\Phi_{ts}^T \ \Phi_{tm}^T \ \Phi_{tg}^T]$ and $\Phi_c^T = [\Phi_{a,11} \ldots \Phi_{a,(n-1)p} \ \Phi_{mlJ} \ldots \Phi_{ml(p-1)}]$. The tree elements can be divided into the magnetic voltage sources of the stator 2 with subscript ts, the magnetic voltage sources of the drive magnets 9 with subscript tm, and the permeances in the tree with subscript tg. Consequently, the sub-vectors of the magnetic fluxes $\Phi_{tg}^T = [\Phi_{m1} \ldots \Phi_{mp} \ \Phi_{b1} \ldots \Phi_{b(p-1)} \ \Phi_{a,np}]$ result. In an analogous manner, the vector of the magnetic voltages $u_t$ of the tree and of the magnetic voltages of the co-tree $u_c$ results, with the vectors of the magnetic voltages $u_{ts}^T = [u_{s,1}, u_{s,2}, \ldots, u_{s,n-1}]$, $u_{tm}^T = [u_{ms1}, u_{ms2}, \ldots, u_{msp}]$ and $u_{tg}^T = [u_{m1}, \ldots, u_{mp}, u_{b1}, \ldots, u_{b(p-1)}, u_{a,np}]$, as well as $u_c^T = [u_{a,11}, \ldots, u_{a,(n-1)p}, u_{ml1}, \ldots, u_{ml(p-1)}]$. The magnetic fluxes and voltages of the tree and of the co-tree are correlated via the matrix V in the form $\Phi_t = V\Phi_c$ and $u_c = -V^T u_t$, wherein the matrix V results from the topology of the reluctance network $RN_L$ and the division into tree and co-tree. The matrix V can again be divided into $V^T = [V_s^T \ V_m^T \ V_g^T]$ in accordance with the above division. The matrix V is dependent on the selected number of stator tooth elements.

The matrix $V_s$ for $n_c$ drive coils 4 (and thus $n = 2n_c + 1$ teeth) can be represented as $V_s = [V_{s1}, 0, V_{s2}, 0, V_{s3}, 0, V_{s4}, 0, V_{s5}, 0, 0, 0, 0]$, wherein the elements 0 describe zero vectors and $V_{sj}$, $j = 1, \ldots, 5$ are lower triangular matrices with the dimension $\dim(V_{sj}) = (n-1) \times (n-1)$, and all entries of this triangular matrix are 1.

For example, the matrix $V_m$ for five drive magnets 8 (p=5) results as $V_m = [V_{m1}, V_{m2}, V_{m3}, V_{m4}, 0, \ldots, 0, V_{ml}]$, with the submatrices of the dimension $\dim(V_{mj}) = p \times n$, $j = 1, \ldots, p-1$. These submatrices result, for example, as $$V_{m1} = \begin{bmatrix} 1 & \cdots & 1 \\ 0 & \cdots & 0 \\ 0 & \cdots & 0 \\ 0 & \cdots & 0 \\ -1 & \cdots & -1 \end{bmatrix}, V_{m2} = \begin{bmatrix} 0 & \cdots & 0 \\ -1 & \cdots & -1 \\ 0 & \cdots & 0 \\ 0 & \cdots & 0 \\ -1 & \cdots & -1 \end{bmatrix}, V_{m3} = \begin{bmatrix} 0 & \cdots & 0 \\ 0 & \cdots & 0 \\ 1 & \cdots & 1 \\ 0 & \cdots & 0 \\ -1 & \cdots & -1 \end{bmatrix},$$

$$V_{m4} = \begin{bmatrix} 0 & \cdots & 0 \\ 0 & \cdots & 0 \\ 0 & \cdots & 0 \\ -1 & \cdots & -1 \\ -1 & \cdots & -1 \end{bmatrix}, V_{ml} = \begin{bmatrix} 1 & 0 & 0 & 0 \\ 1 & -1 & 0 & 0 \\ 0 & -1 & 1 & 0 \\ 0 & 0 & 1 & -1 \\ 0 & 0 & 0 & -1 \end{bmatrix}.$$

From the correlations of the magnetic fluxes and voltages of the tree and the co-tree, the matrix $V_g$ also follows, wherein this matrix in turn contains 0, 1.

The magnetic flux $\Phi$ and the magnetic voltages u are moreover also correlated via the permeances in the form $\Phi_{tg} = G_t u_{tg}$ and $\Phi_c = G_c u_c$, with the permeance matrices of the tree $G_t = \mathrm{diag}[G_m \ldots G_m \ G_b \ldots G_b \ G_{a,np}]$ and of the co-tree $G_c = \mathrm{diag}[G_{a,11} \ldots G_{a,(n-1)p} \ G_{ml} \ldots G_{ml}]$.

In order to obtain the system equations for the entire reluctance network RN ($RN_S + RN_L$), the magnetic flux $\Phi_\Sigma$ in the above boundary condition at the boundary at $y=0$ is expressed by means of the magnetic fluxes in the air gap, which results in $$-T_0\hat{\Phi} + \underbrace{T_c^\Phi \Phi_c + T_t^\Phi \Phi_{tg}}_{\Phi_\Sigma} + G_{s0} T_L^\varphi T_0 \hat{\varphi} = 0.$$

The matrices $T_c^\Phi$ and $T_t^\Phi$ select the air gap fluxes for each of the n teeth and sum them. The result is, for example, $\Phi_{\Sigma 1} = \sum_{j=1}^p \Phi_{a,1j}$.

The above equations which result from the reluctance network of the stator $RN_S$ and the reluctance network of the rotor $RN_L$ can be merged, from which the overall system equations of the entire reluctance network RN can be represented in the form of an equation system $K(x)x - B(i_c) = 0$. This equation system represents the model of the linear motor 1 and can be used as constraint $g(SG,x)$ with $SG = i_c$ and the state vector x or for determining a variable of a quality term $JT_k(SG)$ of the quality functional $J(SG)$. This representation can be specified for any topology of the reluctance network RN.

For the exemplary embodiment according to FIGS. 3, 4 and 5, the state vector with the state variables $x^T = [\hat{\Phi}^T \ \hat{\varphi}^T \ u_{tg}^T \ \psi_c^T]$ and the overall system matrix $$K(x) = \begin{bmatrix} \tilde{D} & -\tilde{A}_1 & 0 & 0 \\ -\tilde{A}_2(\hat{\Phi}) & \tilde{D} & 0 & 0 \\ T_0 & (T_c^\Phi G_c V_s^T T_s^\varphi - G_{s0} T_L^\varphi)T_0 & -(T_t^\Phi - T_c^\Phi G_c V_g^T) & 0 \\ T_L & G_{sy} T_L^\varphi T_L & 0 & 0 \\ 0 & V_g G_c V_s^T T_s^\varphi T_0 & G_t + V_g G_c V_g^T & 0 \\ W & 0 & 0 & I \end{bmatrix}$$

result. The input vector follows as $$B(i_c) = \begin{bmatrix} 0 \\ \tilde{B}i_c \\ -T_c^\Phi V_m^T \mu_{tm} \\ 0 \\ -V_g G_c V_m^T \mu_{tm} \\ 0 \end{bmatrix}.$$

In order to obtain a well-defined equation system, a row $[0\ 0\ \ldots\ 1]\hat{\varphi}=e=0$, with which $\hat{\varphi}_{n(N+1)}=0$ is defined, can be added to the overall system equations.

All system variables can thus be calculated with the model, in particular the linked magnetic fluxes $\psi_c$ of the drive coils 4 as a function of the coil currents $i_c$. The overall system equation system can also be converted easily so that the drive currents $i_c$ are determined as a function of the magnetic fluxes $\psi_c$.

In the case of a linear motor, the coil voltages $v_c$ are usually used as an input variable in that the coil voltages $v_c$ are generated and applied to the drive coil by means of the power electronics system. By using the known law of induction $$\frac{d\psi_c}{dt} = L\frac{di_c}{dt} = -R_c i_c + v_c,$$

with the known ohmic resistance $R_c$ and the known inductance L of the drive coils 4, the coil voltage $v_c$ can be determined from the coil current $i_c$, and vice versa.

From the system equations of the reluctance network RN, the driving forces and/or driving torques, for example the propulsive force $F_x$ and the normal force $F_y$ in the form $$F_x = \frac{1}{2} u_{tg}^T \frac{\partial G_t}{\partial x_s} u_{tg} + \frac{1}{2} y_c^T \frac{\partial G_c}{\partial x_s} u_c,$$

$$F_x = \frac{1}{2} u_{tg}^T \frac{\partial G_t}{\partial y_s} u_{tg} + \frac{1}{2} y_c^T \frac{\partial G_c}{\partial y_s} u_c.$$

can also be derived, for example by using the known principle of magnetic co-energy. Thus, the driving forces, and also the driving torques, acting on the transport unit 3 can also be determined as a function of the relative position $[x_s, y_s]$ of the transport unit 3 relative to the stator 2. The driving forces and driving torques can supplement the model of the long-stator linear motor as a linear motor 1.

The described reluctance model for the long-stator linear motor can naturally be expanded to the case of a planar motor as a linear motor 1.

The invention claimed is:

1. A method for operating a linear motor comprising a stator, on which a plurality of drive coils is arranged, and comprising a transport unit, which is moved along the stator and on which a plurality of drive magnets is arranged, wherein an electromagnetic field, which interacts with the drive magnets of the transport unit for moving the transport unit, is generated by energizing active drive coils in the region of the drive magnets of the transport unit, wherein a quality functional J(SG) is used as a function of manipulated variables (SG) of the active drive coils, wherein the quality functional J(SG) contains a sum of a number k≥1 of quality terms $JT_k$(SG), which are weighted with weighting factors $k_k$ and are dependent on the manipulated variables (SG), wherein the quality functional J(SG) contains a quality term $JT_k$(SG), which evaluates a deviation of a specified movement setpoint variable of the control of the movement of the transport unit from an actual variable of the control which is dependent on the manipulated variable (SG), wherein the quality functional J(SG) is optimized for the control of the movement of the transport unit along the stator with regard to the manipulated variables (SG) in order to determine optimal manipulated variables ($SG_{opt}$) for the relevant time step of the control of the movement, and the active drive coils are energized according to the determined optimal manipulated variables ($SG_{opt}$), and wherein during the movement of the transport unit along the stator, at least two movement phases are provided, wherein in the at least two movement phases, different quality functionals J(SG) are used for determining the optimal manipulated variables ($SG_{opt}$), wherein the different quality functionals J(SG) differ by the number k of the quality terms $JT_k$(SG) used and/or by the quality terms $JT_k$(SG) and/or by the weighting factors $k_k$.

2. The method according to claim 1, wherein the quality functional J(SG) is optimized on-line during the movement of the transport unit in each time step of the control in order to determine the optimal manipulated variables ($SG_{opt}$) in the relevant time step of the control of the movement.

3. The method according to claim 1, wherein the quality functional J(SG) is optimized off-line for a specified movement of the transport unit along the stator in order to calculate in advance the optimal manipulated variables ($SG_{opt}$) to be set during the performance of the movement.

4. The method according to claim 1, wherein for the different quality functionals J(SG) of the at least two movement phases, movement characteristic maps, which map a movement setpoint variable and a position of the transport unit relative to the active drive coils to optimal manipulated variables ($SG_{opt}$), are created in advance by off-line optimization, and wherein during the performance of the movement of the transport unit, the associated optimal manipulated variables ($SG_{opt}$) are read out from a movement characteristic map on the basis of a determined actual position of the transport unit relative to the active drive coils and a specified setpoint value of the movement setpoint variable.

5. The method according to claim 1, wherein the optimal manipulated variables ($SG_{opt}$) are adjusted in a manipulated variable controller.

6. The method according to claim 1, wherein the quality functional J(SG) contains a quality term $JT_k$(SG) which evaluates the electrical power required for the movement of the transport unit.

7. The method according to claim 6, wherein as a quality term $JT_k$(SG), the square of the Euclidean norm of a vector with the manipulated variables (SG) of the energized drive coils is used, i.e., $JT_k(SG)=k_i \cdot \|SG\|_2^2$.

8. The method according to claim 1, wherein the quality functional J(SG) contains a quality term $JT_k$(SG) of the form $JT_k(SG)=k_e(BS-IS(SG))^2$ or $JT_k(SG)=k_e(BS-IS(SG))$.

9. The method according to claim 1, wherein the quality functional J(SG) contains a quality term $JT_k$(SG) which evaluates a sum $SG_\Sigma$ of the manipulated variables (SG), preferably as a square of the sum, i.e., $JT_k(SG)=k_\Sigma SG_\Sigma^2$ or $JT_k(SG)=k_\Sigma SG_\Sigma$.

10. The method according to claim 1, wherein a quality term $JT_k$(SG) contains a variable which is determined using a mathematical model of the linear motor.

11. The method according to claim 1, wherein a constraint g(SG) in the form of a mathematical model of the linear motor is taken into account in the optimization.

12. The method according to claim 10, wherein the linear motor is modeled with a reluctance network as a network with branches, in which reluctances R, permeances G or magnetic voltage sources are arranged and in which magnetic fluxes $\Phi$ flow.

13. The method according to claim 12, wherein the stator of the linear motor is modeled with a number n of teeth connected by a stator yoke, wherein a differential section dy of each of the number n of teeth is modeled by a branch of the reluctance network of the stator with a differential reluctance $R'_a(\Phi_t)$, $R'_c(\Phi_t)$ and, in the case of a drive coil, on one of the number of teeth with a magnetic voltage source with a differential magnetic voltage $u'_{c,j}$, wherein a magnetic potential $\varphi_n(y)$, $\varphi_n(y+dy)$ is applied to the ends of each branch, and a magnetic flux $\Phi_n(y)$ flows in a branch, and two adjacent branches are connected by a differential permeance G', which models a magnetic coupling of two adjacent teeth through a tooth interspace to form nodes of the reluctance network of the stator, in-that wherein the stator yoke is modeled by linear permeances $G_{sy}$, which connect two adjacent branches of the reluctance network of the stator ($RN_S$) to form further nodes of the reluctance network of the stator ($RN_S$), and wherein an air gap at the end of the stator opposite the stator yoke is modeled by leakage permeances $G_{s0}$, which connect two adjacent branches of the reluctance network of the stator ($RN_S$) to form further nodes of the reluctance network of the stator, and by a magnetic flux $\Phi_{\Sigma n}$ in the air gap.

14. The method according to claim 13, wherein at each node of the reluctance network of the stator, a node sum of the magnetic fluxes $\Phi_n(y)$ in the branches and of the magnetic potential $\varphi_n(y)$, $\varphi_n(y+dy)$ on the branches is formulated in order to obtain, as system equations of the stator, an equation system that models the stator of the linear motor.

15. The method according to claim 12, wherein the transport unit and an air gap between teeth of the stator and the drive magnets on the transport unit, which are connected by a magnet yoke, are modeled with a reluctance network of the rotor, in which the p drive magnets are modeled as branches of the reluctance network of the rotor with a linear permeance $G_m$ and with a magnetic voltage $u_{msp}$ of a magnetic voltage source, wherein the ends of the branches are connected by leakage permeances $G_{ml}$ at the air gap and linear permeances $G_b$ at the magnet yoke to form nodes of the reluctance network of the rotor, wherein the nodes at the air gap are linked to further branches of the reluctance network of the rotor, in which air gap permeances $G_{a,ij}$ are arranged, wherein each of the p drive magnets in the reluctance network of the rotor is connected via a respective air gap permeance $G_{a,ij}$ to each of the n teeth in the reluctance network of the stator, and wherein the branches with the air gap permeances $G_{a,ij}$ are connected by voltage sources representing the stator to the magnetic voltages $u_s$ to respectively form further nodes of the reluctance network of the rotor.

16. The method according to claim 15, wherein from the reluctance network of the rotor, an equation system which models the air gap and the transport unit is formed as system equations of the rotor.

17. The method according to claim 14, wherein from the system equations formed from the reluctance networks, driving forces and/or driving torques acting on the transport unit are derived.

18. A linear motor comprising a stator, on which a plurality of drive coils is arranged, and comprising a transport unit, which is moved along the stator and on which a plurality of drive magnets is arranged, wherein active drive coils in the region of the drive magnets of the transport unit are energized in order to generate an electromagnetic field, wherein the electromagnetic field interacts with the drive magnets of the transport unit for moving the transport unit, wherein a control unit is provided, in which a quality functional J(SG) is implemented as a function of manipulated variables (SG) of the energized active drive coils, wherein the quality functional J(SG) contains a sum of a number k≥1 of quality terms $JT_k(SG)$, which are weighted with weighting factors $k_k$ and are dependent on the manipulated variables (SG), wherein the quality functional J(SG) contains a quality term $JT_k(SG)$, which evaluates a deviation of a specified movement setpoint variable of the control of the movement of the transport unit from an actual variable of the control which is dependent on the manipulated variable (SG), wherein the control unit optimizes the quality functional J(SG) for the control of the movement of the transport unit along the stator with regard to the manipulated variables (SG) in order to determine optimal manipulated variables ($SG_{opt}$) for the relevant time step of the control of the movement, and the drive coils are energized according to the determined optimal manipulated variables ($SG_{opt}$), and wherein during the movement of the transport unit along the stator, at least two movement phases are provided in the control unit, wherein different quality functionals J(SG) for determining the optimal manipulated variables ($SG_{opt}$) are implemented for the at least two movement phases, wherein the different quality functionals J(SG) differ by the number k of the quality terms $JT_k(SG)$ used and/or by the quality terms $JT_k(SG)$ and/or by the weighting factors $k_k$.

\* \* \* \* \*